(12) United States Patent
Lawson

(10) Patent No.: US 11,091,267 B1
(45) Date of Patent: Aug. 17, 2021

(54) ACTUATABLE TRAY ASSEMBLY FOR AN AIRCRAFT PASSENGER COMPARTMENT

(71) Applicant: B/E Aerospace, Inc., Winston-Salem, NC (US)

(72) Inventor: Bobby Lawson, Walnut Cove, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/688,026

(22) Filed: Nov. 19, 2019

(51) Int. Cl.
*B64D 11/06* (2006.01)

(52) U.S. Cl.
CPC ...... *B64D 11/0605* (2014.12); *B64D 11/0638* (2014.12); *B64D 11/0606* (2014.12)

(58) Field of Classification Search
CPC .......... B64D 11/0605; B64D 11/0638
See application file for complete search history.

(56) References Cited

U.S. PATENT DOCUMENTS

| 2,292,797 | A | 8/1942 | Roberts |
| 5,820,194 | A | 10/1998 | Slayter |
| 8,616,137 | B2 | 12/2013 | Collins et al. |
| 8,979,189 | B2 | 3/2015 | Henshaw et al. |
| 9,102,410 | B2 | 8/2015 | Frost et al. |
| 9,398,805 | B2 | 7/2016 | Khankal et al. |
| 9,708,066 | B2 | 7/2017 | Thompson et al. |
| 2017/0021932 | A1 | 1/2017 | Marais |
| 2018/0281966 | A1 | 10/2018 | Chuang et al. |
| 2019/0061954 | A1 | 2/2019 | Miedema et al. |

FOREIGN PATENT DOCUMENTS

| CN | 204137324 U | 2/2015 |
| EP | 2052906 A2 | 4/2009 |
| EP | 2215926 A1 | 8/2010 |
| EP | 2630892 A1 | 8/2013 |
| EP | 3213994 A1 | 9/2017 |

*Primary Examiner* — Anthony D Barfield
(74) *Attorney, Agent, or Firm* — Suiter Swantz pc llo

(57) ABSTRACT

An actuatable tray assembly for an aircraft passenger compartment may include a tray and an actuation assembly. The tray may be configured to stow underneath a monument positioned proximate to an aircraft seat in the aircraft passenger compartment. The actuation assembly may include a bracket coupled to the monument. The bracket may include at least one track member. The actuation assembly may include at least one rail configured to actuate along the at least one track member. The actuation assembly may include a carriage coupled to the tray and configured to actuate the tray in a first direction along the at least one rail from a stowed position to a first extended position. The carriage and the at least one rail may be configured to actuate the tray in a second direction along the at least one track member from the first extended position to a second extended position.

19 Claims, 20 Drawing Sheets

ACTUATABLE TRAY ASSEMBLY FOR AN AIRCRAFT PASSENGER COMPARTMENT

BACKGROUND

In commercial transportation vehicles such as passenger aircraft, components within business class passenger seat compartments are arranged to minimize an amount of room each aircraft passenger compartment and its components require within an aircraft cabin, in an effort to increase the number of aircraft passenger compartments within the aircraft cabin. This may include modifying the arrangement and/or storage of aircraft passenger compartment components including, but not limited to, an aircraft seat, an aircraft ottoman, an aircraft tray or table, or other structures and/or monuments of the aircraft passenger compartment. However, modifications to the arrangement and/or storage of many passenger compartment components need to be done while meeting or exceeding safety regulations.

SUMMARY

An actuatable tray assembly for an aircraft passenger compartment is disclosed, in accordance with one or more embodiments of the disclosure. The actuatable tray assembly may include a tray configured to stow underneath a monument positioned proximate to an aircraft seat in the aircraft passenger compartment. The actuatable tray assembly may include an actuation assembly. The actuation assembly may include a bracket coupled to the monument. The bracket may include at least one track member. The actuation assembly may include at least one rail configured to actuate along the at least one track member via at least one slider. The actuation assembly may include a carriage coupled to the tray. The carriage may be configured to actuate the tray in a first direction along the at least one rail from a stowed position to a first extended position. The carriage and the at least one rail may be configured to actuate the tray in a second direction along the at least one track member via the at least one slider from the first extended position to a second extended position.

In some embodiments, the second direction may be at a select angle relative to the first direction.

In some embodiments, the first direction may include a translation of the tray across a body of a passenger in the aircraft seat. The second direction may include a translation of the tray toward or away the passenger in the aircraft seat.

In some embodiments, the translation of the tray across the body of the passenger in the aircraft seat may occur before the translation of the tray toward or away the passenger in the aircraft seat.

In some embodiments, a distance in the first direction between the stowed position to the first extended position may be less than a distance in the second direction between the first extended position and the second extended position.

In some embodiments, at least a portion of the carriage and the at least one rail may be protected by a cover.

In some embodiments, the at least one slider may be coupled to a surface of the cover.

In some embodiments, the at least one track member may include a first track member and a second track member. The at least one slider may include a first slider configured to actuate along the first track member and a second slider configured to actuate along the second track member. The at least one rail may include a first rail and a second rail. A first end of the first rail and a first end of the second rail may be coupled to the first track member via the first slider. A second end of the first rail and a second end of the second rail may be coupled to the second track member via the second slider. The carriage may be coupled to the first rail and the second rail.

In some embodiments, the first track member and the second track member may be coupled together via at least one crossmember.

In some embodiments, the bracket may be in a U-shape formed by the first track member, the second track member, and the at least one crossmember.

In some embodiments, the carriage may be a two-stage carriage with a carriage actuation assembly.

In some embodiments, the actuation of the tray in the first direction along the at least one rail from the stowed position to the first extended position may include a translation of a first portion of the carriage and a second portion of the carriage along the at least one rail.

In some embodiments, the actuation of the tray in the first direction along the at least one rail from the stowed position to the first extended position may include a translation of the first portion of the carriage relative to the second portion of the carriage via the carriage actuation assembly.

In some embodiments, the bracket may be coupled to a bottom surface of the monument.

An aircraft passenger compartment for an aircraft cabin is disclosed, in accordance with one or more embodiments of the disclosure. The aircraft passenger compartment may include an aircraft seat. The aircraft passenger compartment may include a monument positioned proximate to the aircraft seat. The aircraft passenger compartment may include an actuatable tray assembly. The actuatable tray assembly may include a tray configured to stow underneath the monument. The actuatable tray assembly may include an actuation assembly. The actuation assembly may include a bracket coupled to the monument. The bracket may include at least one track member. The actuation assembly may include at least one rail configured to actuate along the at least one track member via at least one slider. The actuation assembly may include a carriage coupled to the tray. The carriage may be configured to actuate the tray in a first direction along the at least one rail from a stowed position to a first extended position. The carriage and the at least one rail may be configured to actuate the tray in a second direction along the at least one track member via the at least one slider from the first extended position to a second extended position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
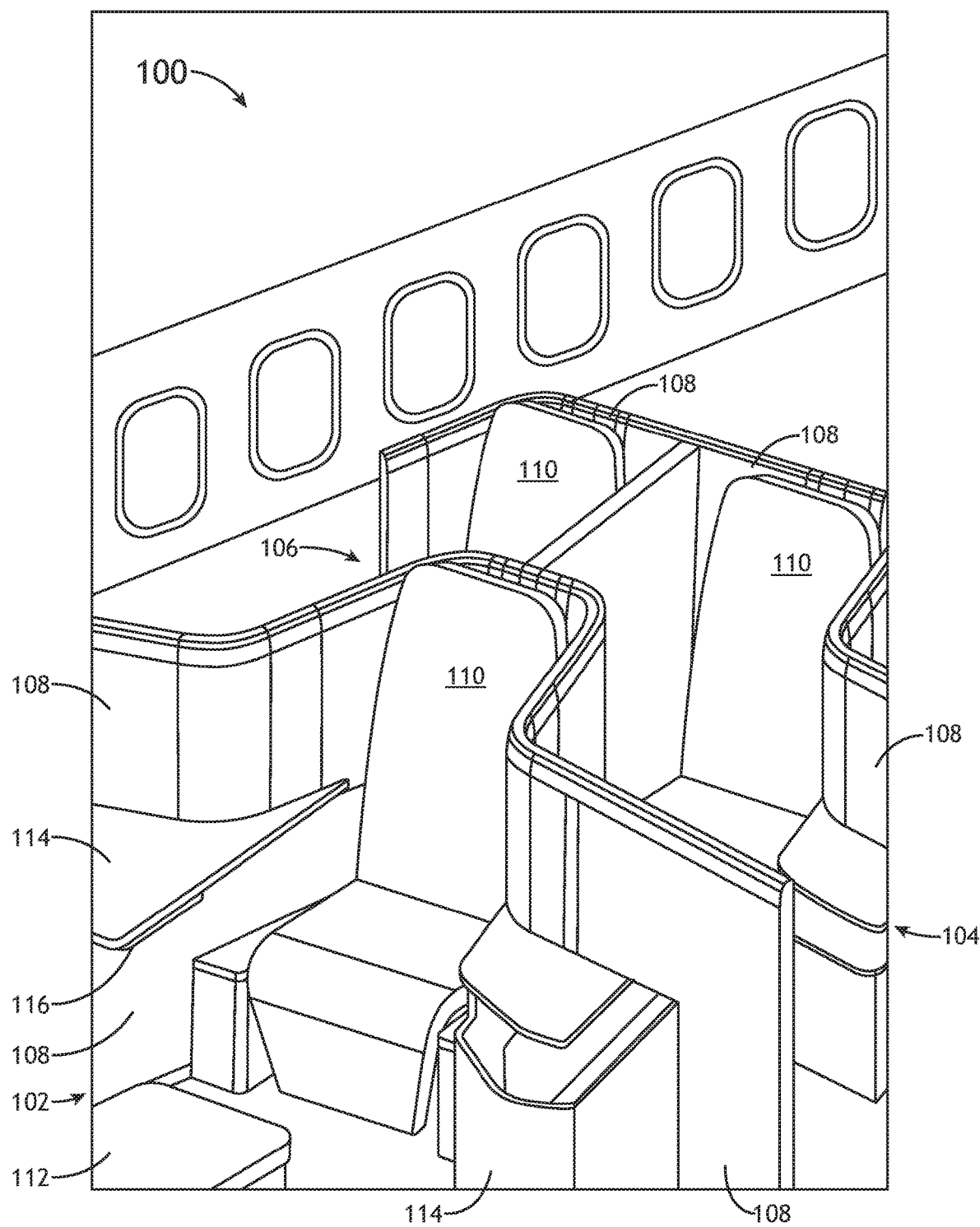
FIG. 1 illustrates a perspective view of an aircraft cabin including a set of aircraft passenger compartments, each aircraft passenger compartment including an aircraft seat and an actuatable tray assembly, in accordance with one or more embodiments of the disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1-10 generally illustrate an actuatable tray assembly for an aircraft passenger compartment, in accordance with one or more embodiments of the disclosure.

Arranging business class seat aircraft passenger compartments may require minimizing an amount of room each aircraft passenger compartment and its components require within an aircraft cabin to increase the number of aircraft passenger compartments within the aircraft cabin. This minimizing may include modifying the arrangement and/or design of components including, but not limited to, an aircraft seat, an aircraft ottoman, an aircraft tray or table, or other structures and/or monuments of the aircraft passenger compartment.

When modifying an aircraft tray to allow for a more compact arrangement of the business class seat passenger compartments, load-bearing or weight-bearing requirements must be met without losing the intended functionality of the aircraft tray. For example, the aircraft tray may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

As such, it would be beneficial to provide an actuatable tray assembly for an aircraft passenger compartment that has a minimized footprint and is able to meet or exceed aviation guidelines and/or standards.

FIG. 1 illustrates an aircraft cabin 100 including a set of aircraft passenger compartments, each aircraft passenger compartment including an aircraft seat and an actuatable tray, in accordance with one or more embodiments of the disclosure.

The aircraft cabin 100 may include different types of aircraft passenger compartments, where each type of aircraft passenger compartment has a particular arrangement of components including, but not limited to, an aircraft seat, an actuatable tray, an aircraft seat ottoman (or ottoman), or other components set within a shell having a defined shape. For example, the aircraft cabin 100 may include an aircraft passenger compartment 102, an aircraft passenger compartment 104, and/or an aircraft passenger compartment 106.

Each of the aircraft passenger compartments 102, 104, 106 may include one or more passenger compartment shell sections 108 and an aircraft seat 110. The one or more passenger compartment shell sections 108 may be configured to receive at least a portion of the aircraft seat 110. For example, the one or more compartment shell sections 108 may be configured to wrap around a seat back of the aircraft seat 110.

The aircraft passenger compartments 102, 104, 106 may be separate but nested together. One or more seals may be positioned between adjacent passenger compartment shell sections 108 of the aircraft passenger compartments 102, 104, 106 to allow for movement between adjacent passenger compartments (e.g., for purposes of decompression) while preventing a rubbing of and/or noise-generating between passenger compartment shell sections of adjacent passenger compartments.

Each of the aircraft passenger compartments 102, 104, 106 may include an aircraft seat ottoman 112 (or ottoman 112, for purposes of the present disclosure) positioned a select distance in front of the aircraft seat 110. The ottoman 112 and the aircraft seat 110 may be separated by a select distance. The ottoman 112 may be positioned within a footwell. For example, one or more dimensions of the footwell may be changed by transitioning the aircraft seat 110 between the upright position, the recline position, and/or the lie-flat position. It is noted herein that a portion of the ottoman 112 may be actuatable (e.g., along a set of tracks or linear rails) to a position outside of the footwell.

The ottoman 112 may be configured to translate and/or rotate about an axis through a sidewall of the ottoman 112, such that a top surface of the ottoman 112 may be pointed toward a passenger occupying the aircraft seat 110 or a ceiling of the aircraft cabin 100. For example, where the ottoman 112 may be configured to both translate and rotate, the ottoman 112 may be configured to independently rotate and/or translate. By way of another example, where the ottoman 112 may be configured to both translate and rotate, a rotation may prevent further translation until the ottoman 112 is returned to a select position. By way of another example, where the ottoman 112 may be configured to both translate and rotate, a translation may prevent further rotation until the ottoman 112 is returned to a select position.

It is noted herein the aircraft seat 110 and/or the ottoman 112 may be integrated into existing passenger compartments 102, 104, 106. In addition, it is noted herein the aircraft seat 110 and/or the ottoman 112 may be configured to be operable in conjunction with existing convertible aircraft seat systems known in the art.

The aircraft seat 110 and the ottoman 112 may form a bed when the aircraft seat 110 and the ottoman 112 are each in a lie-flat or bed position. It is noted herein, however, that the aircraft seat 110 and/or the ottoman 112 may be limited to an upright position and/or one or more recline positions. In addition, it is noted herein that the aircraft seat 110 may be the sole component forming a bed when the aircraft seat 110 is in a lie-flat or bed position.

The aircraft seat 110 may be translatable (e.g., trackable or slidable) into a position including, but not limited to, a forward (or fore) position and/or a rearward (or aft) position. The aircraft seat 110 may be rotatable about an axis crosswise through the aircraft seat 110 into a position including, but not limited to, an upright or raised position, one or more reclined positions, and/or a lie-flat or bed position. The aircraft seat 110 may be rotatable about an axis (e.g., swivelable) through the aircraft seat 110 into a position including, but not limited to, an inboard position, a forward-facing position (or rear-facing position, depending on seat placement within the aircraft passenger compartments 102, 104, 106), and/or an outboard position. The aircraft seat 110 may be fully positionable between the outer limits of motion as defined by the moveable components of the aircraft seat 110, and/or other monuments in the aircraft passenger compartments 102, 104, 106.

It is noted herein a combination of a fully upright position, a fully rearward (or fully forward position, depending on seat placement within the aircraft passenger compartments 102, 104, 106), and a fully forward-facing position (or fully rear-facing position, depending on seat placement within the aircraft passenger compartments 102, 104, 106) may be considered a taxi, takeoff, or landing (TTOL) position during select stages of flight, for purposes of the present disclosure. In addition, it is noted herein that any position that does not meet the above-defined requirements of the TTOL position may be considered a non-TTOL position, for purposes of the present disclosure. Further, it is noted herein the aircraft seat 110 may be translatable and/or rotatable from the TTOL position to a non-TTOL position, and/or vice versa.

Each of the aircraft passenger compartments 102, 104, 106 may include one or more monuments 114. For example, a monument 114 may include, but is not limited to, a side stand, a tray or table, or the like. A monument 114 may include an accessible surface for a passenger occupying the aircraft passenger compartments 102, 104, 106.

Each of the aircraft passenger compartments 102, 104, 106 may include a tray 116. The tray 116 may include a top surface, a bottom surface, and one or more side surfaces. For example, the tray 116 may include a single continuous side surface where all corners are rounded. By way of another example, the tray 116 may include up to an N number of side surfaces where the tray 116 includes up to an N number of corners.

In some of the aircraft passenger compartments 102, 104, 106, the tray 116 may be coupled to a monument 114 of the one or more monuments 114. Any or all of the aircraft passenger compartments 102, 104, 106 may include one or more components positioned within a layout unique to that particular type of aircraft passenger compartment. In this regard, any or all of the aircraft passenger compartments 102, 104, 106 may require a unique arrangement for the tray 116.

The aircraft passenger compartments 102, 104, 106 may include one or more lights. For example, the one or more lights may be positioned proximate and/or partially inset within the one or more passenger compartment shell sections 108.

The aircraft passenger compartments 102, 104, 106 may include one or more stowage compartments. For example, a stowage compartment may include a door. By way of another example, a stowage compartment may be configured to receive and hold (e.g., contain, secure, or the like) one or more pieces of carry-on luggage. By way of another example, a stowage compartment may be configured to receive paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), or other passenger amenities. The one or more stowage compartments may be secured to and/or at least be partially inset within the one or more passenger compartment shell sections 108, the one or more monuments 114, or the like.

The aircraft passenger compartments 102, 104, 106 may include one or more passenger in-flight entertainment devices (IFEs). For example, the one or more IFEs may include, but are not limited to, one or more display devices secured to and/or at least be partially inset within an aircraft passenger compartment shell section 108.

Referring generally to FIGS. 2A-8B, the tray 116 may be actuatable between various positions (e.g., a stowed (or stored) position and at least one extended position) via an actuatable tray assembly. It is noted herein the tray 116 may be considered a component of the actuatable tray assembly, for purposes of the disclosure.

Figure 2A:
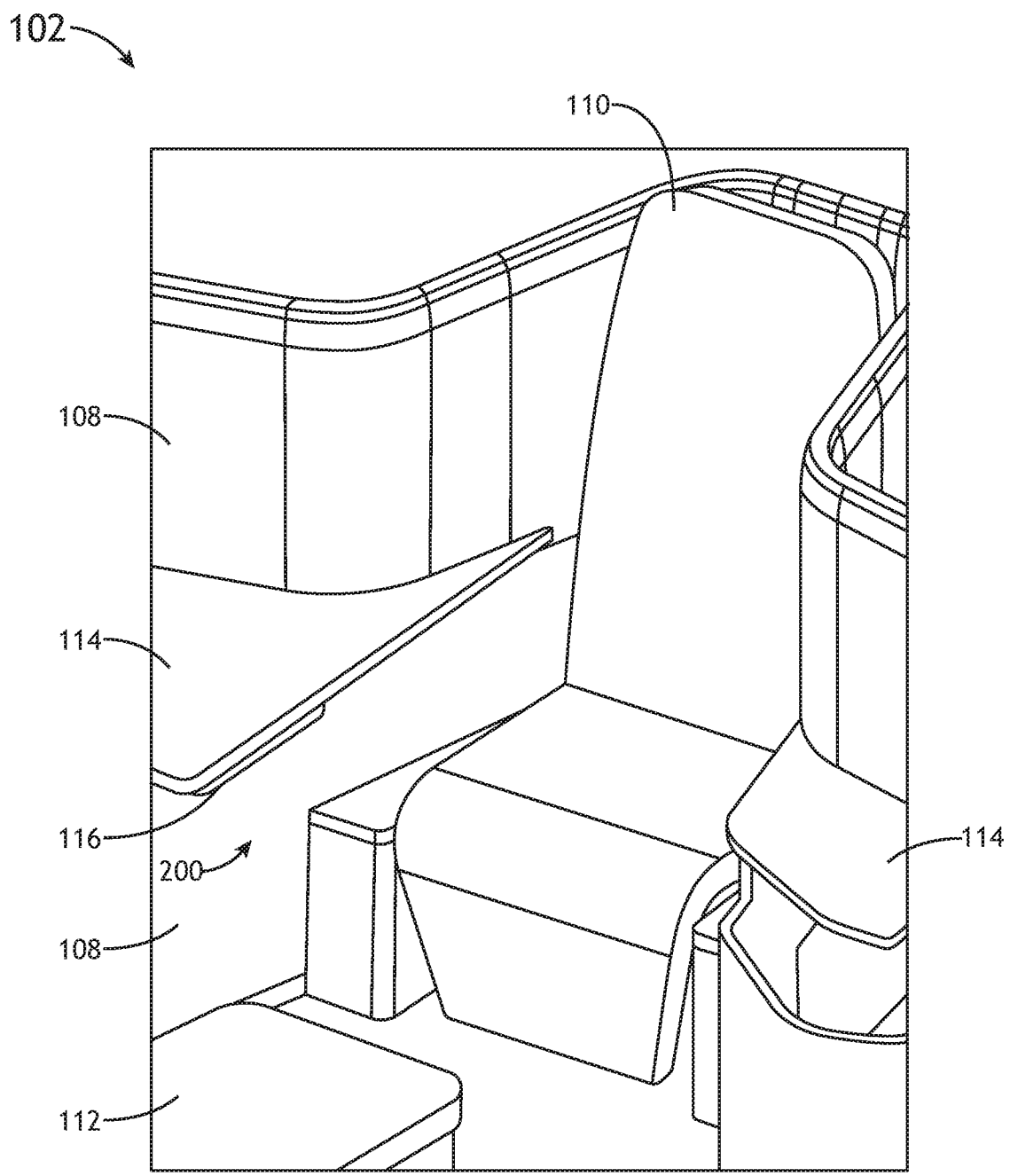
FIG. 2A illustrates a perspective view of an aircraft passenger compartment including an aircraft seat and an actuatable tray assembly, in accordance with one or more embodiments of the disclosure.
Figure 2B:
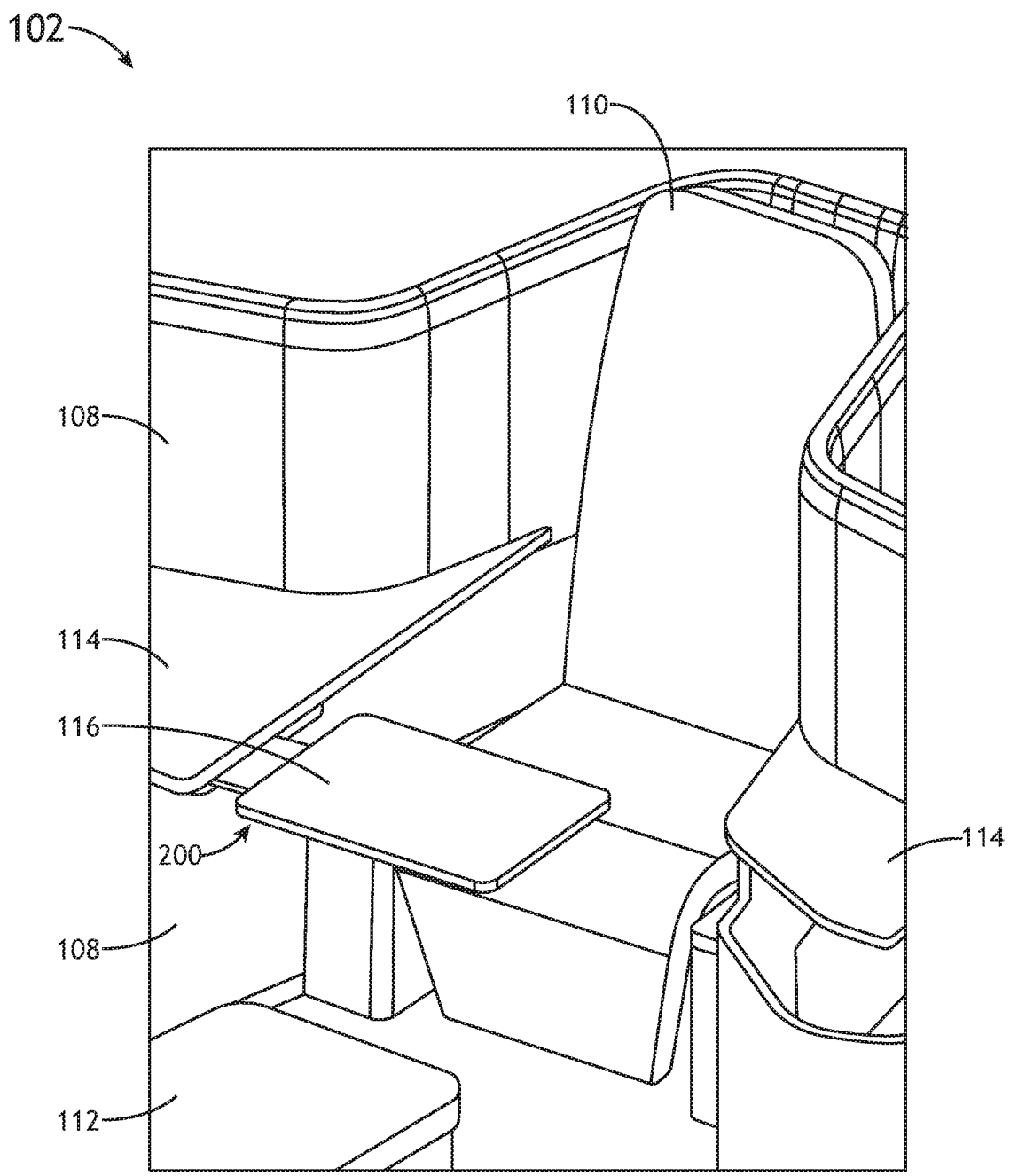
FIG. 2B illustrates a perspective view of an aircraft passenger compartment including an aircraft seat and an actuatable tray assembly, in accordance with one or more embodiments of the disclosure.
Figure 2C:
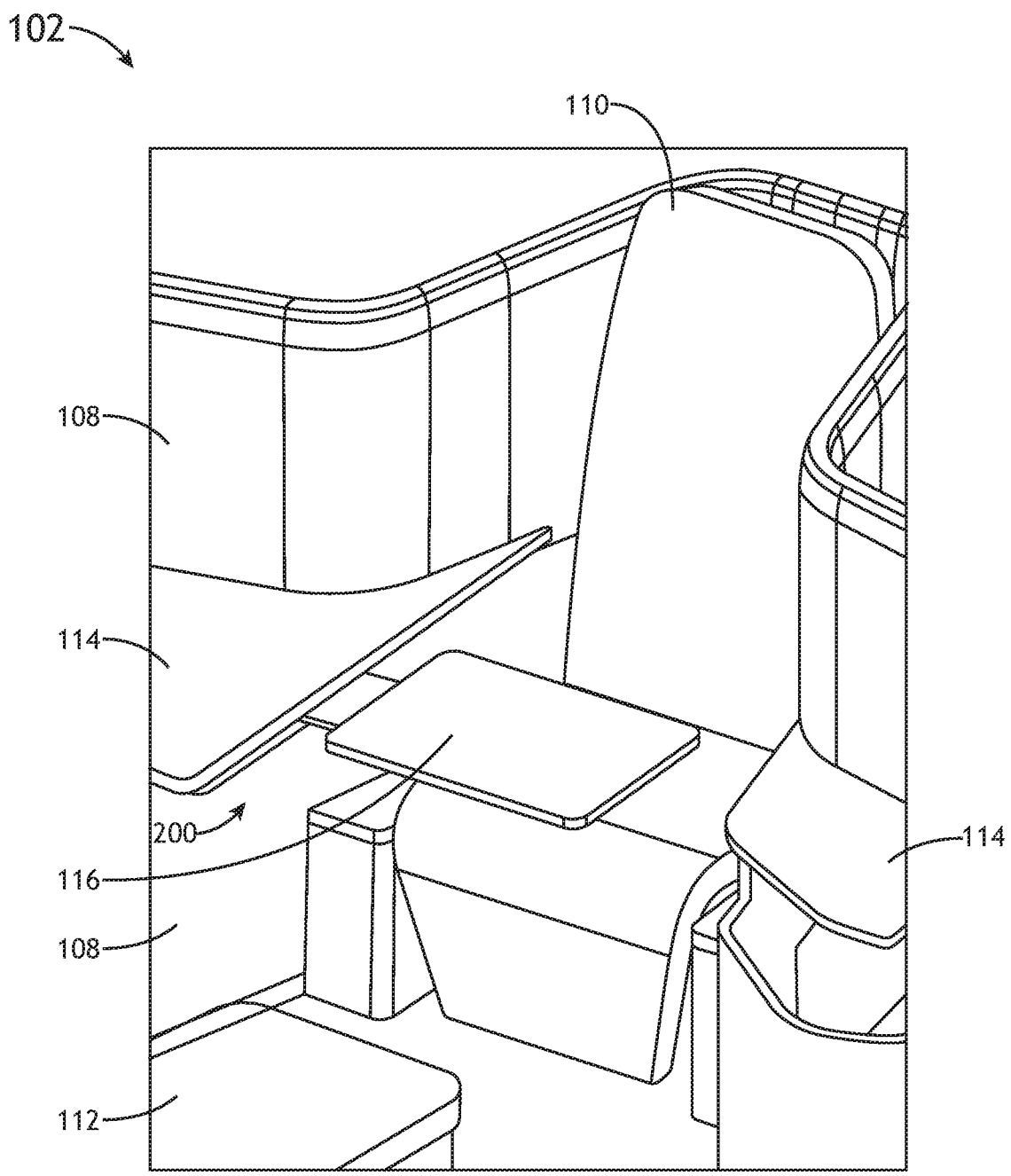
FIG. 2C illustrates a perspective view of an aircraft passenger compartment including an aircraft seat and an actuatable tray assembly, in accordance with one or more embodiments of the disclosure.

FIG. 2A-2C generally illustrate the tray 116 in various positions within the aircraft passenger compartment 102 relative to other components of the aircraft passenger compartment 102, in accordance with one or more embodiments of the disclosure. FIGS. 3A-3E generally illustrate components of an actuation assembly 300 configured to actuate the tray 116 relative to other components of the aircraft passenger compartment 102, in accordance with one or more embodiments of the disclosure.

Figure 3A:
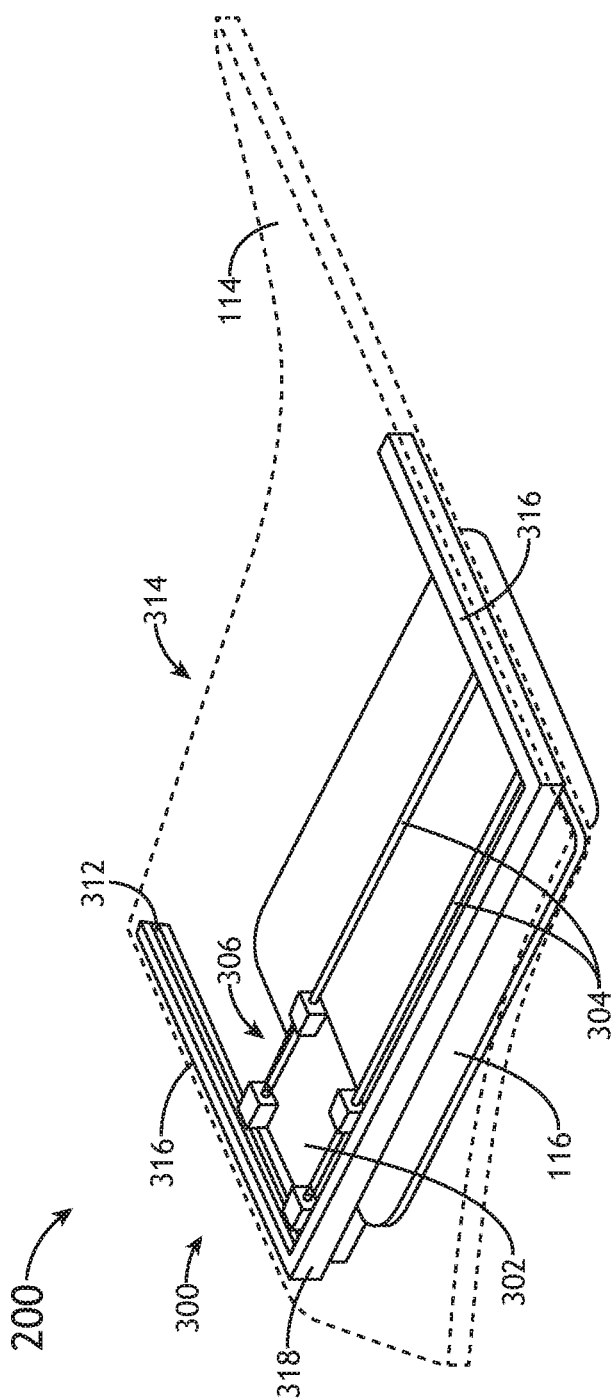
FIG. 3A illustrates an actuatable tray assembly and a portion of an aircraft passenger compartment, in accordance with one or more embodiments of the disclosure.

As illustrated in FIGS. 2A and 3A, the tray 116 may be stowed (or stored) underneath a monument 114 in a stowed (or stored) position.

The tray 116 may be a component of an actuatable tray assembly 200.

The tray 116 may be entirely stowed under the monument 114. It is noted herein, however, that at least a portion of the tray 116 may extend from underneath the monument 114 (e.g., for ease of passenger interaction). For example, the tray 116 may extend from underneath the monument 114 by an amount that does not interfere with the passenger's access or usage of the aircraft seat 110, the ottoman 112, any monuments 114 configured to be interacted with by the passenger, or other components of the aircraft passenger compartment 102.

Figure 3B:
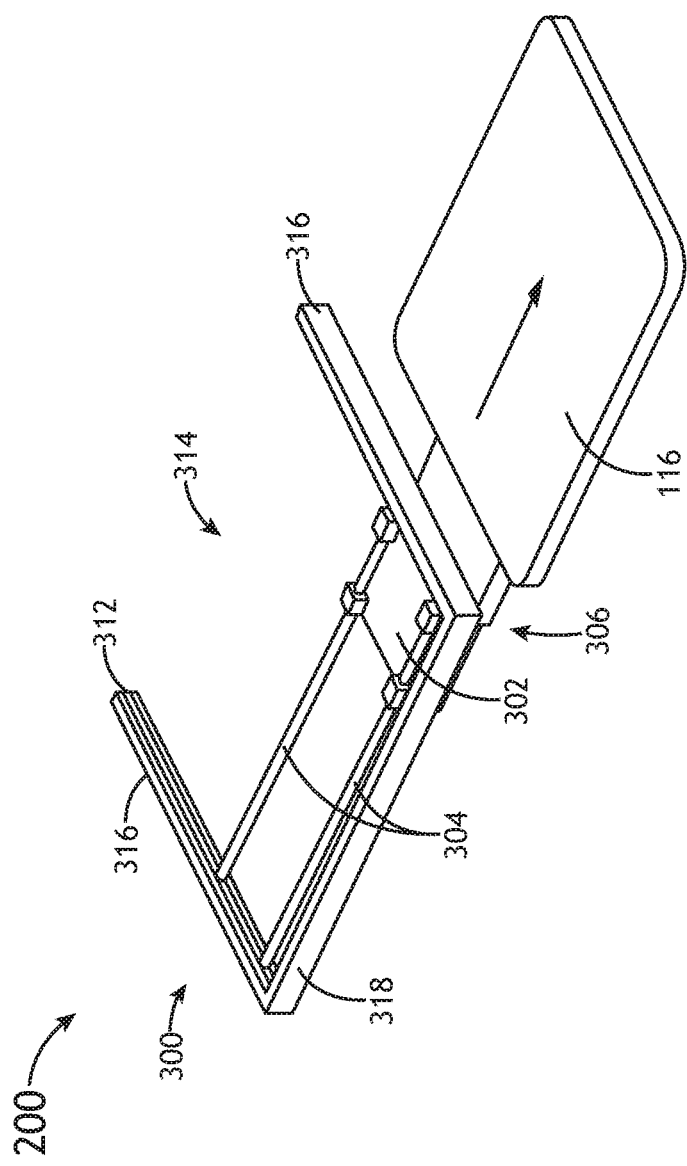
FIG. 3B illustrates an actuatable tray assembly, in accordance with one or more embodiments of the disclosure.

As illustrated in FIGS. 2B and 3B, the tray 116 may be translated laterally (e.g., across a passenger in the aircraft seat 110) from underneath the monument 114 in the stowed position and to a first extended position.

The tray 116 may be unlocked from the stowed position (e.g., as illustrated in FIGS. 2A and 3A) via a manual latching or locking assembly (e.g., a push-to-release latch, or the like) to translate to the first extended position (e.g., as illustrated in FIGS. 2B and 3B). For example, the manual latching or locking assembly may be situated directly on the tray 116. By way of another example, the manual latching locking assembly may have one or more components situated elsewhere in the aircraft passenger compartment 102 (e.g., on the aircraft seat 110, on a monument 114, or the like). The tray 116 may be unlocked from the stowed position (e.g., as illustrated in FIGS. 2A and 3A) via an electronic latching or locking assembly.

The tray 116 may be coupled to the monument 114 via an actuation assembly 300. The tray 116 and the actuation assembly 300 may be components of the actuatable tray assembly 200.

The actuation assembly 300 may include a carriage 302 configured to actuate along one or more rails 304. For example, the carriage 302 may translate along the one or more rails 304. For instance, the carriage 302 may translate laterally across a passenger in the aircraft seat 110 from underneath the monument 114. The carriage 302 may be coupled to the tray 116. For example, the carriage 302 may be coupled to a bottom surface of the tray 116.

The carriage 302 may be a single-stage carriage or a multi-stage carriage. Where the carriage 302 is a single-stage carriage, the carriage 302 is a single piece, and the tray 116 may translate laterally (e.g., across the passenger in the aircraft seat 110) from underneath the monument 114 a first amount (e.g., the length of the rails 304).

Where the carriage 302 is a multi-stage carriage, the carriage 302 includes a first component and a second component coupled together via a carriage actuation assembly 306, and the tray 116 may translate laterally (e.g., across the passenger in the aircraft seat 110) from underneath the monument 114 a first amount (e.g., the length of the rails 304) and a second amount (e.g., some distance based on the carriage actuation assembly 306, and based on a relationship between a width of the first component of the carriage 302 and a width of the second component of the carriage 302).

Where the carriage 302 is a multi-stage carriage, the lateral translation along the rails 304 and the lateral translation via the carriage actuation assembly 306 may be tied together, as the carriage actuation assembly 306 may include a cam follower assembly (e.g., a cam follower in a cam-shaped track) for a smooth transition. Here, the cam follower may be attached to the tray 116 and not the multi-stage carriage 302. It is noted herein, however, that a multi-stage carriage 302 may be designed to first travel the length of the one or more rails 304 and then travel the distance based on the relationship between the width of the first component of the carriage 302 and the width of the second component of the carriage 302. Therefore, the above description should not be interpreted as a limitation on the scope of the disclosure but merely an illustration.

The carriage actuation assembly 306 may be assisted by one or more actuation devices. For example, the one or more actuation devices may include, but are not limited to, one or more springs (e.g., gas springs, mechanical springs, or the like), one or more actuators (e.g., solenoids, servo motors, or the like), and/or one or more mechanical assemblies driven by an actuator (e.g., one or more gear assemblies such as a worm gear-and-wheel assembly or a rack-and-pinion assembly, one or more chain-and-sprocket assemblies, one or more belt-and-pulley assemblies, or the like).

Figure 3C:
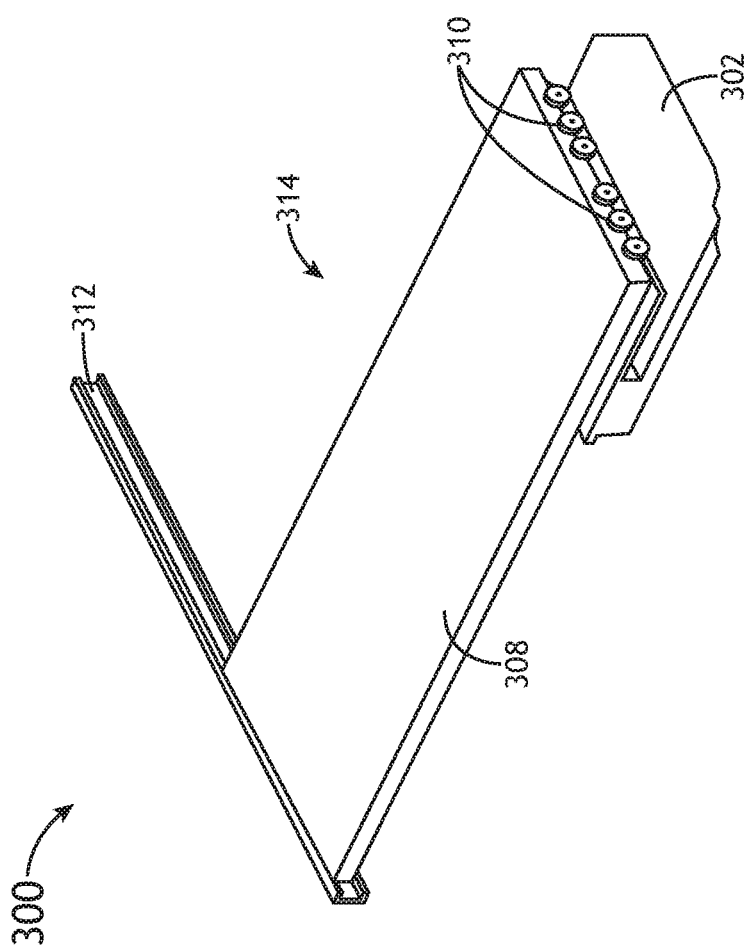
FIG. 3C illustrates a portion of an actuatable tray assembly, in accordance with one or more embodiments of the disclosure.

As illustrated in FIG. 3C, the actuatable assembly 300 may include a shield or cover 308. For example, at least a portion of the carriage 302 and/or the one or more rails 304 may be protected by the cover 308.

Figure 3D:
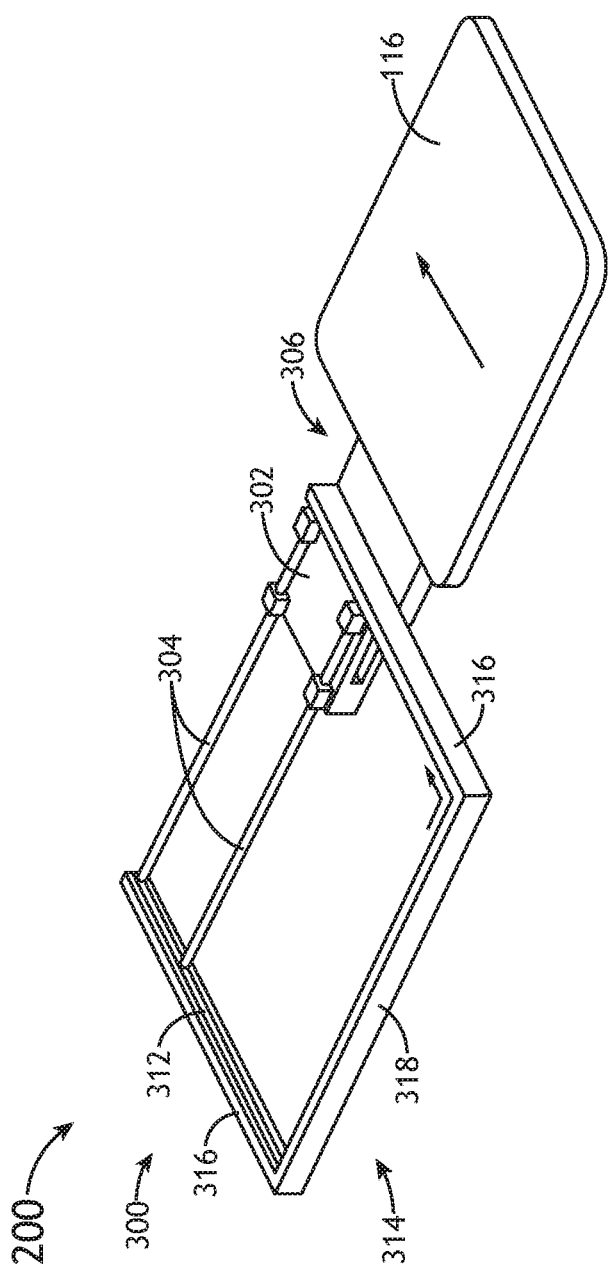
FIG. 3D illustrates an actuatable tray assembly, in accordance with one or more embodiments of the disclosure.
Figure 3E:
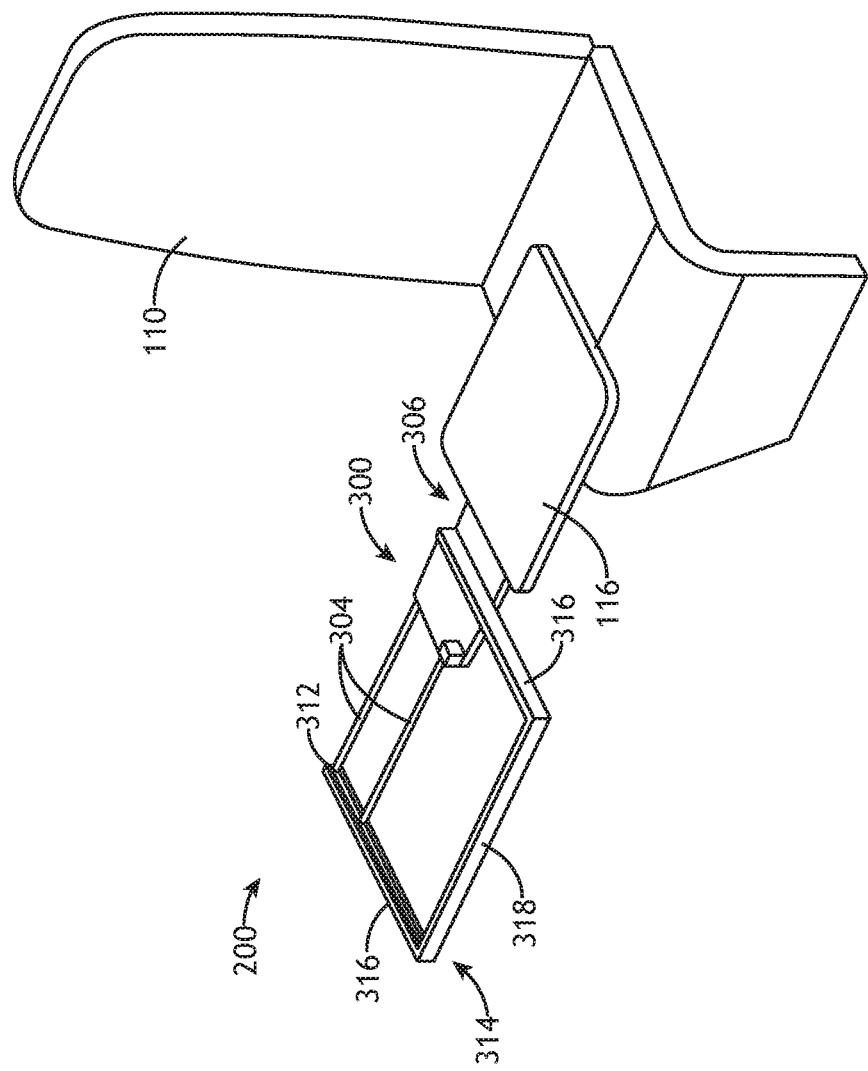
FIG. 3E illustrates an aircraft seat and an actuatable tray assembly, in accordance with one or more embodiments of the disclosure.

As illustrated in FIGS. 2C, 3D, and 3E, the tray 116 may be translated from the first extended position and to a second extended position proximate to the passenger in the aircraft seat 110.

The actuation assembly 300 may include one or more sliders 310 and one or more tracks 312. For example, a slider 310 may include a set of bearings (e.g., round bearings). By way of another example, a slider 310 may include a set of precision ball bearings. The one or more sliders 310 may be configured to cause the cover 308 (and the at least a portion of the carriage 302 and/or the one or more rails 304 housed within the cover 308) to actuate along the one or more tracks 312. For example, the one or more rails 304 may be coupled to an interior surface of the cover 308, such that the one or more rails 304 may translate forward or backward (e.g., toward or away from the passenger in the aircraft seat 110) with the cover 308 via the one or more sliders 310 along the set of tracks 312.

For instance, the one or more tracks 312 may include a first track 312 and a second track 312. The one or more sliders 310 may include a first slider 310 coupled to a first surface of the cover 308 and configured to actuate along the first track 312. The one or more sliders 310 may include a second slider 310 coupled to a second surface of the cover 308 and configured to actuate along the second track 312. The one or more rails 304 may include a first rail 304 and a second rail 304. A first end of the first rail 304 and a first end of the second rail 304 may be coupled to the first track 312 via the first slider 310. A second end of the first rail 304 and a second end of the second rail 304 may be coupled to the second track 312 via the second slider 310. The carriage 302 may be coupled to the first rail 304 and the second rail 304.

Although embodiments of the present disclosure illustrate the one or more sliders 310 as being coupled to the cover 308, it is noted herein the actuatable assembly 300 may not include the cover 308. Instead, the one or more rails 304 may be directly coupled to the one or more sliders 310. For example, the first rail 304 may be directly coupled to the first slider 310 and configured to actuate along the first track 312, and may be directly coupled to the second slider 310 and configured to actuate along the second track 312. By way of another example, the second rail 304 may be directly coupled to the first slider 310 and configured to actuate along the first track 312, and may be directly coupled to the second slider 310 and configured to actuate along the second track 312. The first rail 304 and the second rail 304 may be coupled to the same set including the first slider 310 and the second slider 310, or may be coupled to different sets including a first slider 310 and a second slider 310. Therefore, the above description should not be interpreted as a limitation on the scope of the disclosure but merely an illustration.

The translation of the one or more sliders 310 along the one or more tracks 312 may be assisted by one or more actuation devices. For example, the one or more actuation devices may include, but are not limited to, one or more springs (e.g., gas springs, mechanical springs, or the like), one or more actuators (e.g., solenoids, servo motors, or the like), and/or one or more mechanical assemblies driven by an actuator (e.g., one or more gear assemblies such as a worm gear-and-wheel assembly or a rack-and-pinion assembly, one or more chain-and-sprocket assemblies, one or more belt-and-pulley assemblies, or the like).

The actuation assembly 300 may include a bracket 314. The bracket 314 may be coupled to the monument 114. For example, the bracket 314 may be coupled to a bottom surface of the monument 114. The bracket 314 may include one or more track members 316. The one or more tracks 312 may be coupled to the one or more track members 316. The bracket 314 may include one or more crossmembers 318 coupled to the one or more track members 316. For example, the one or more track members 316 and the one or more crossmembers 318 of the bracket 314 may form a U-shape, I-shape, or other shape. It is noted herein, however, that the bracket 314 may not require the one or more crossmembers 318, and that the bracket 314 may only include the one or more track members 316.

The tray 116 may lock into the second extended position via a manual latching or locking assembly (e.g., a push-to-release latch, or the like). For example, the manual latching or locking assembly may be situated directly on the tray 116. By way of another example, the manual latching locking assembly may have one or more components situated elsewhere in the aircraft passenger compartment 102 (e.g., on the aircraft seat 110, on a monument 114, or the like). The tray 116 may be unlocked via an electronic latching or locking assembly.

It is noted herein the direction of the actuation of the tray 116 between the first extended position and the second extended position may be at an angle relative to the direction of the actuation of the tray 116 between the stowed position to the first extended position. For example, the direction of the actuation of the tray 116 between the first extended position and the second extended position and the direction of the actuation of the tray 116 between the stowed position to the first extended position may be set in a shared plane with shared axes. For instance, the angle may be substantially perpendicular, such that the tray 116 may follow an L-shaped pathway in the shared plane from the stowed position through the first extended position and to the second extended position, when considered with the lateral translation as illustrated in FIGS. 2B and 3B. For instance, a distance between the stowed position to the first extended position may be less than a distance between the first extended position and the second extended position.

The tray 116 may be configured to fully complete the lateral translation before the forward/backward translation. In this regard, the tray 116 may be locked in the lateral translation unless the tray 116 is in the first extended position, from which the tray 116 may return to the stowed position (e.g., under the monument 114). It is noted herein, however, that the tray 116 may be configured to perform the forward/backward translation at any point along the lateral translation, such that the tray 116 is not dependent on the first extended position to return to the stowed position (e.g., under the monument 114).

Figure 4A:
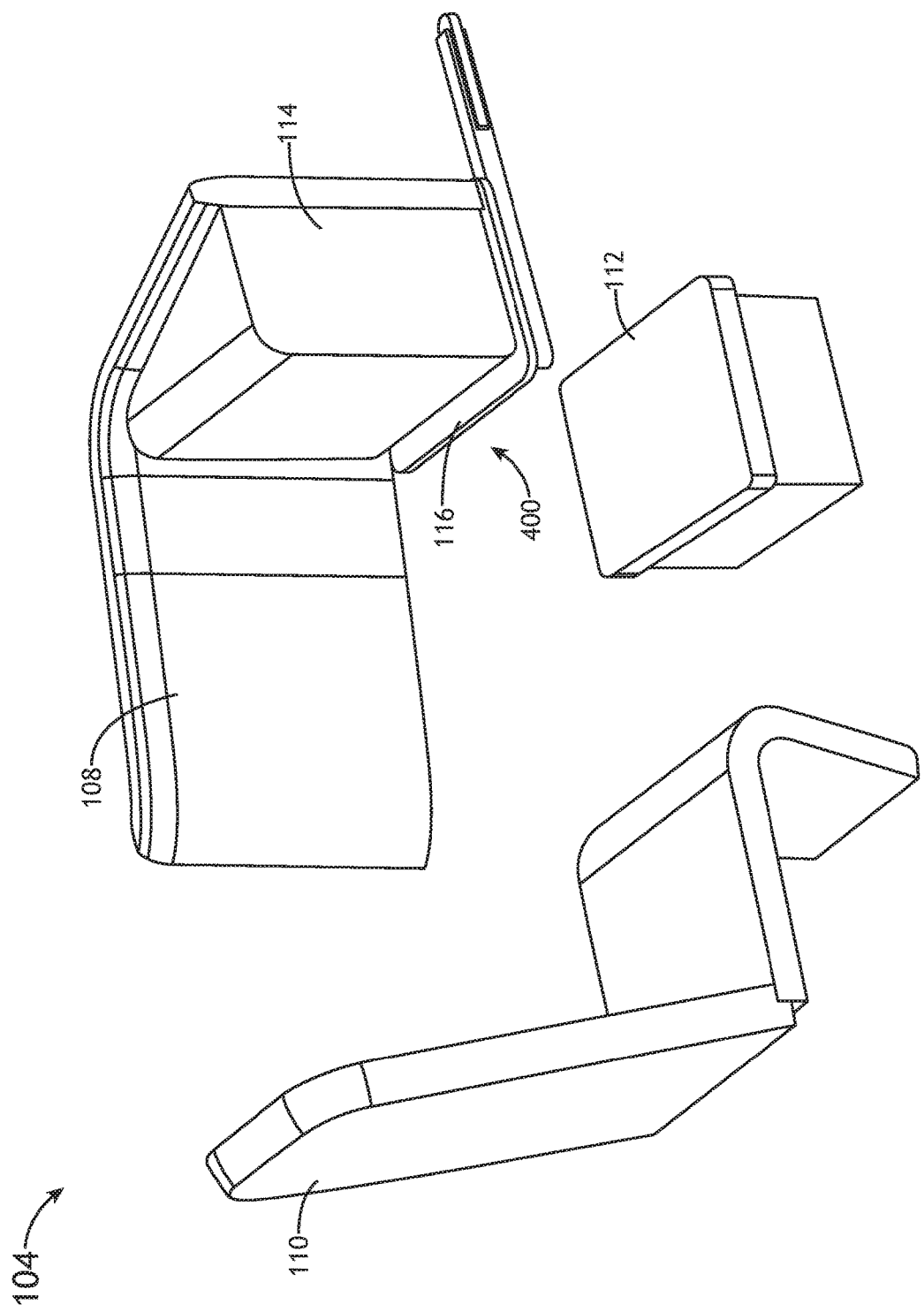
FIG. 4A illustrates an aircraft seat, an actuatable tray assembly, and a portion of an aircraft passenger compartment, in accordance with one or more embodiments of the disclosure.
Figure 4B:
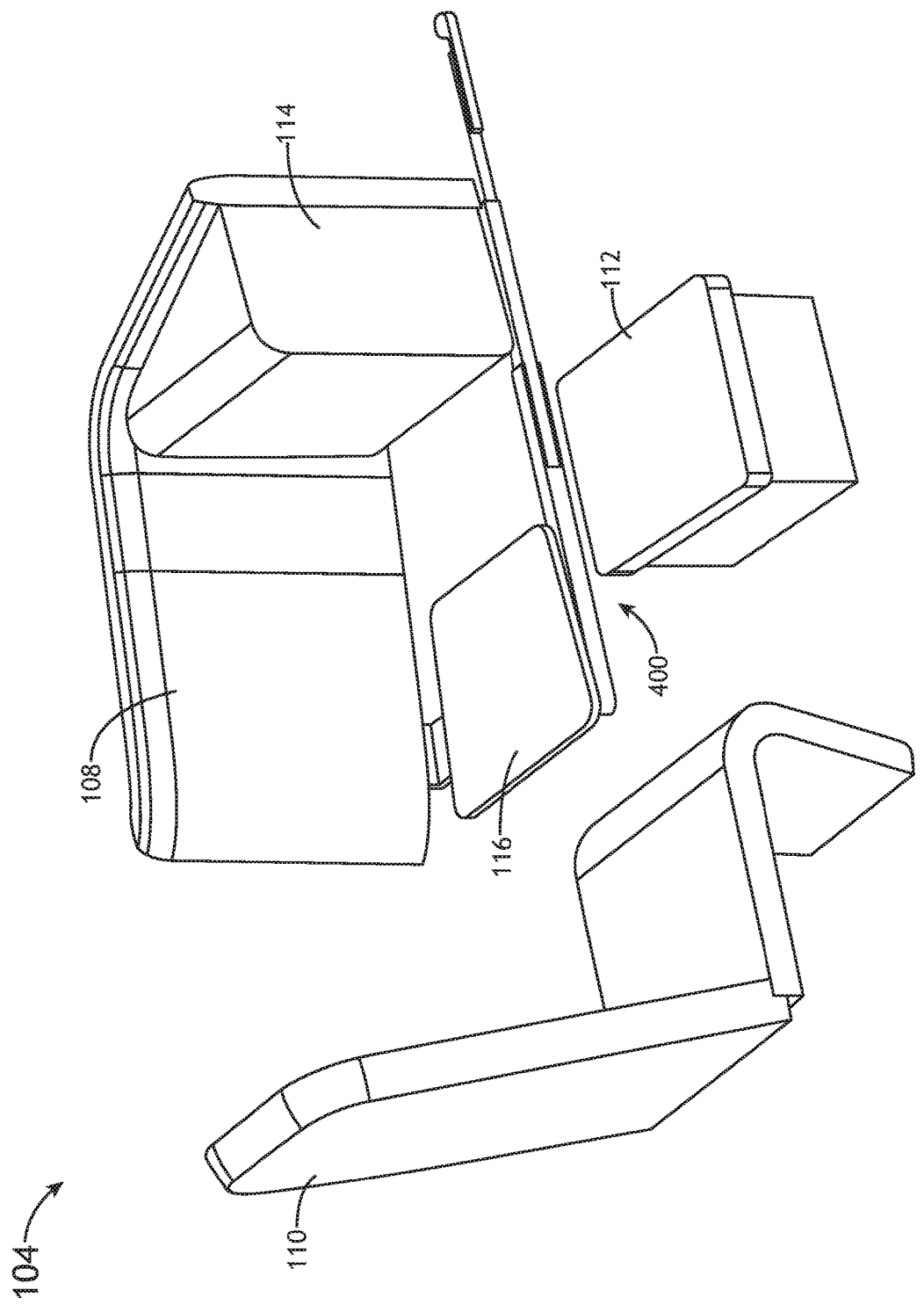
FIG. 4B illustrates an aircraft seat, an actuatable tray assembly, and a portion of an aircraft passenger compartment, in accordance with one or more embodiments of the disclosure.
Figure 5A:
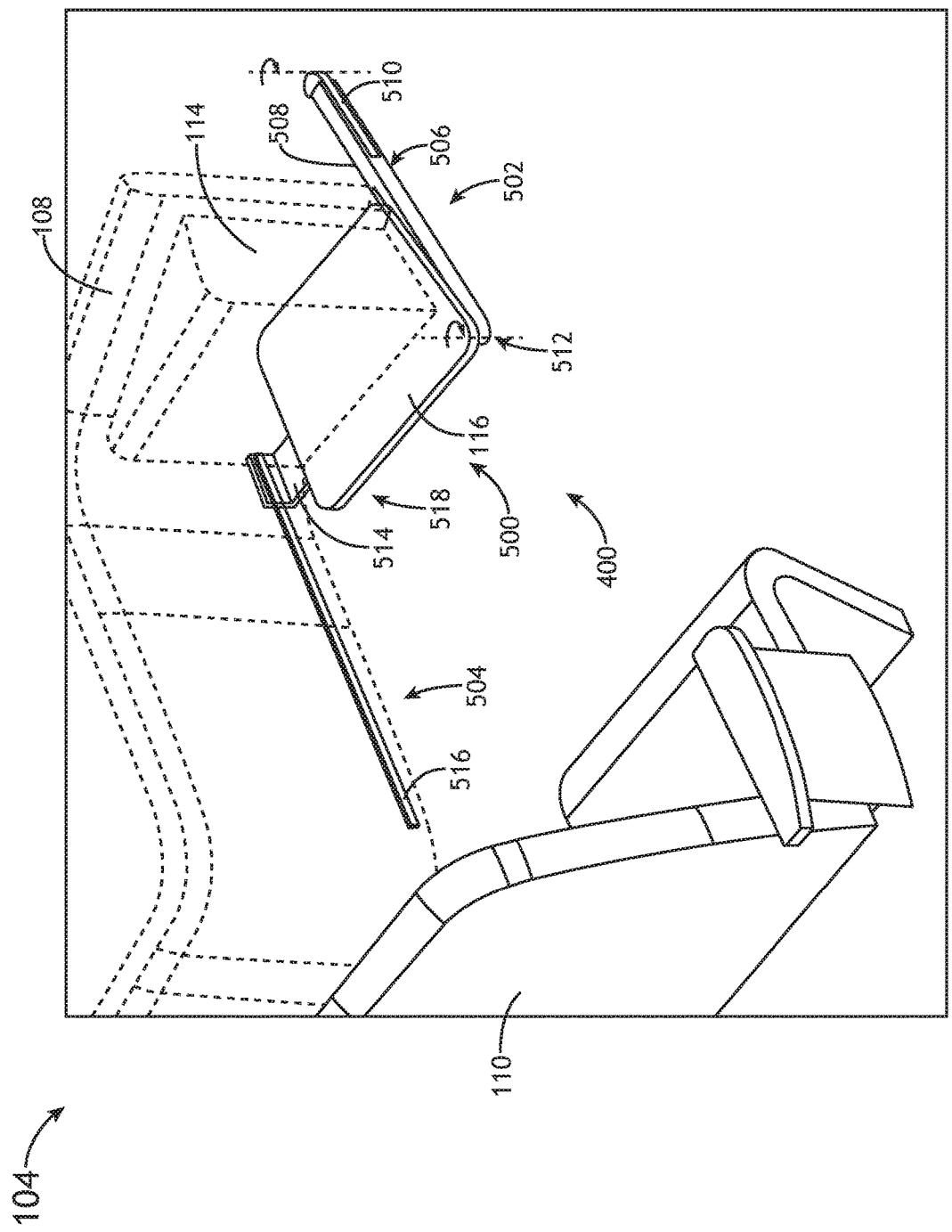
FIG. 5A illustrates an actuatable tray assembly and a portion of an aircraft passenger compartment, in accordance with one or more embodiments of the disclosure.
Figure 5B:
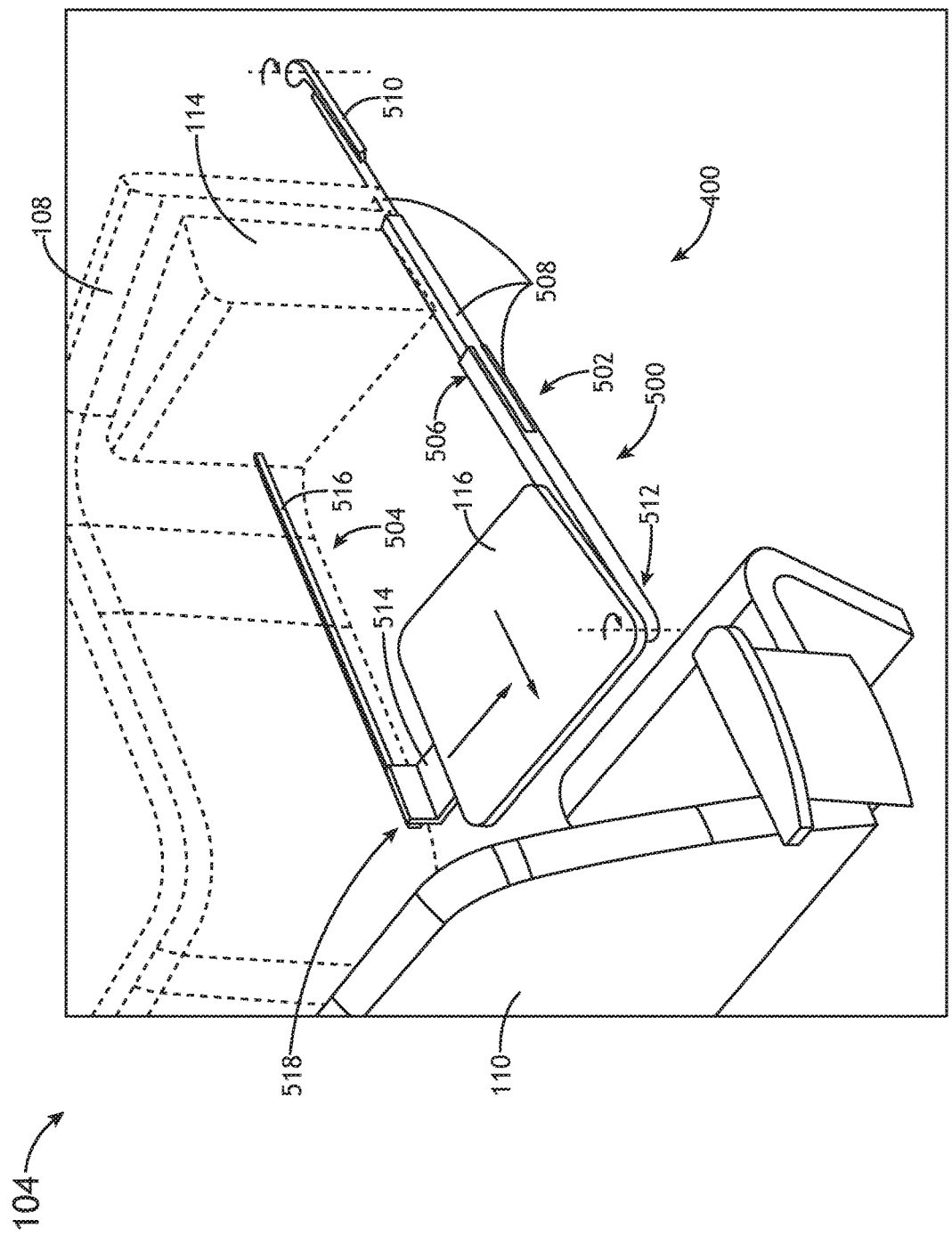
FIG. 5B illustrates an aircraft seat, an actuatable tray assembly, and a portion of an aircraft passenger compartment, in accordance with one or more embodiments of the disclosure.

FIGS. 4A and 4B generally illustrate the tray 116 in various positions within the aircraft passenger compartment 104 relative to other components of the aircraft passenger compartment 104, in accordance with one or more embodiments of the disclosure. FIGS. 5A and 5B generally illustrate components of an actuation assembly 500 configured to actuate the tray 116 relative to other components of the aircraft passenger compartment 104, in accordance with one or more embodiments of the disclosure.

As illustrated in FIGS. 4A and 5A, the tray 116 may be stowed (or stored) underneath a monument 114 in a stowed (or stored) position.

The tray 116 may be a component of an actuatable tray assembly 400.

The tray 116 may be entirely stowed under the monument 114. For example, the tray 116 may be positioned above the ottoman 112 when the tray 116 is stowed underneath the monument 114. It is noted herein, however, that at least a portion of the tray 116 may extend from underneath the monument 114 (e.g., for ease of passenger interaction). For example, the tray 116 may extend from underneath the monument 114 a select amount such that the tray 116 may be flush with a display device mounted on the monument 114. By way of another example, the tray 116 may extend from underneath the monument 114 by an amount that does not interfere with the passenger's access or usage of the aircraft seat 110, the ottoman 112, any monuments 114 configured to be interacted with by the passenger, or other components of the aircraft passenger compartment 104.

As illustrated in FIGS. 4B and 5B, the tray 116 may be translated from underneath the monument 114 in the stowed position and to an extended position proximate to the passenger in the aircraft seat 110.

The tray 116 may be unlocked from the stowed position (e.g., as illustrated in FIGS. 4A and 5A) via a manual latching or locking assembly (e.g., a push-to-release latch, or the like) to translate to the extended position as illustrated in (e.g., FIGS. 4B and 5B). For example, the manual latching or locking assembly may be situated directly on the tray 116. By way of another example, the manual latching locking assembly may have one or more components situated elsewhere in the aircraft passenger compartment 104 (e.g., on the aircraft seat 110, on a monument 114, or the like). The tray 116 may be unlocked from the stowed position (e.g., as illustrated in FIGS. 4B and 5B) via an electronic latching or locking assembly.

The tray 116 may be coupled to the monument 114 via an actuation assembly 500. The tray 116 and the actuation assembly 500 may components of the actuatable tray assembly 400.

The actuation assembly 500 may include an extension rail assembly 502 and a linear rail assembly 504. One or more components of the extension rail assembly 502 and/or one or more components of the linear rail assembly 504 may be coupled to the tray 116.

The extension rail assembly 502 may include an extension rail 506 with at least two telescoping sections 508. For example, the extension rail 506 may include three telescoping sections 508, such that the extension rail 506 is a double-extension rail 506.

The extension rail 506 may be coupled to one or more passenger compartment shell sections 108 and/or a monument 114 via a pivot 510. For example, the extension rail 506 may be coupled to an underneath or non-exposed surface of the one or more passenger compartment shell sections 108 and/or a monument 114 via the pivot 510. The extension rail 506 may rotate about an axis (e.g., a substantially vertical axis, or some other axis) through the pivot 510 as the tray 116 translates from the stowed position to the extended position. For example, the rotation about the axes through the pivot 510 may naturally occur with the translation of the tray 116 from the stowed position to the extended position.

The extension rail 506 may be coupled to the tray 116 via a pivot 512. For example, the extension rail 506 may be coupled to an underneath or non-exposed surface of the tray 116 via the pivot 512. The extension rail 506 may rotate about an axis (e.g., a substantially vertical axis, or some other axis) through the pivot 512 as the tray 116 translates from the stowed position to the extended position. For example, the rotation about the axes through the pivot 512 may naturally occur with the translation of the tray 116 from the stowed position to the extended position.

The linear rail assembly 504 may include a carriage 514 configured to actuate along one or more linear rails 516. For example, the one or more linear rails 516 may be fixed in place underneath one or more passenger compartment shell sections 108 and/or a monument 114. The tray 116 may be coupled to the carriage 514 and configured to actuate along the one or more linear rails 516 with the carriage 514. For example, the direction of actuation by the carriage 514 along the one or more linear rails 516 may be constant (e.g., there is no rotation about an axis such as a vertical axis through the carriage 514, or some other axis) between the stowed position and the extended position, where the one or more linear rails 516 are fixed in place. By way of another example, the carriage 514 may be coupled to a bottom surface of the tray 116.

The translation of the carriage 514 along the one or more linear rails 516 may be assisted by one or more actuation devices. For example, the one or more actuation devices may include, but are not limited to, one or more springs (e.g., gas springs, mechanical springs, or the like), one or more actuators (e.g., solenoids, servo motors, or the like), and/or one or more mechanical assemblies driven by an actuator (e.g., one or more gear assemblies such as a worm gear-and-wheel assembly or a rack-and-pinion assembly, one or more chain-and-sprocket assemblies, one or more belt-and-pulley assemblies, or the like).

To accommodate the rotation through the axes of the pivots 510, 512 of the extension rail assembly 502, the actuation assembly 500 may include a carriage actuation assembly 518, to which the tray 116 may be coupled. For example, the carriage actuation assembly 518 may be configured to adjust the tray 116 to the passenger (e.g., laterally across the body of the passenger in the aircraft seat 110). For instance, the adjustment may occur as the carriage 514 actuates along the linear rail assembly 504 (e.g., between the stowed position and the extended position). In addition, the adjustment may occur as the extension rail assembly 502 rotates about the axes of the pivots 510, 512 of the extension rail assembly 502 during translation of the tray 116 from the stowed position to the extended position. It is noted herein the carriage actuation assembly 518 may be unlocked to adjust the tray 116 to the passenger (e.g., laterally across the body of the passenger in the aircraft seat 110) via a manual latching or locking assembly (e.g., a push-to-release latch, or the like). For example, the manual latching or locking assembly may be situated directly on the tray 116. By way of another example, the manual latching locking assembly may have one or more components situated elsewhere in the aircraft passenger compartment 104 (e.g., on the aircraft seat 110, on a monument 114, or the like). The tray 116 may be unlocked via an electronic latching or locking assembly.

It is noted herein the carriage actuation assembly 518 may be a component of and/or coupled to the carriage 514.

The carriage actuation assembly 518 may be assisted by one or more actuation devices. For example, the one or more actuation devices may include, but are not limited to, one or more springs (e.g., gas springs, mechanical springs, or the like), one or more actuators (e.g., solenoids, servo motors, or the like), and/or one or more mechanical assemblies driven by an actuator (e.g., one or more gear assemblies such as a worm gear-and-wheel assembly or a rack-and-pinion assembly, one or more chain-and-sprocket assemblies, one or more belt-and-pulley assemblies, or the like).

Although embodiments of the disclosure illustrate the extension rail assembly 502 as including both the pivot 510 and the pivot 512, it is noted herein that the extension rail assembly 502 may require only the pivot 510 or the pivot 512. For example, only the pivot 510 or the pivot 512 may be necessary, depending on the arrangement of the one or more passenger compartment shell sections 108 and/or a monument 114 to which the one or more linear rails 516 may be coupled. Therefore, the above description should not be interpreted as a limitation on the scope of the disclosure but merely an illustration.

The design of the actuation assembly 500 may be configured to minimize the visibility of the components of the extension rail assembly 502 and the linear rail assembly 504. For example, the extension rail assembly 502 may be positioned behind or underneath the one or more passenger compartment shell sections 108 and/or the one or more monuments 114, such that the extension rail assembly 102 may not be visible when the tray 116 is in the stowed position. By way of another example, the number of components of the linear rail assembly 504 positioned underneath the one or more passenger compartment shell sections 108 and/or the one or more monuments 114 may be reduced when the tray 116 is in the extended position. By way of another example, the one or more linear rails 516 of the linear rail assembly 504 may be positioned behind or underneath the one or more passenger compartment shell sections 108 and/or the one or more monuments 114 so as reduce to viewed parts of the linear rail assembly 504 to only a portion of the carriage 514 (e.g., the one or more linear rails 516 are not visible to the passenger in the aircraft seat 110).

Although embodiments of the present disclosure are directed to the actuation assembly 500 including the extension rail assembly 502 and the linear rail assembly 504, it is noted herein the actuation assembly 500 may include only multiple extension rail assemblies 502. It is contemplated, however, that the components of multiple extension rail assemblies 502 may be too visible to the passenger of the aircraft passenger compartment 104 from a design desirability standpoint and/or may not meet aviation guidelines and standards (e.g., related to weight support and distribution). In addition, it is noted herein the actuation assembly 500 may include only multiple linear rail assemblies 504. It is contemplated, however, that the components of multiple linear rail assemblies 504 may be too visible to the passenger of the aircraft passenger compartment 104 and/or may not provide enough flexibility in the translation of the tray 116 (e.g., due to the lack of pivoting). Therefore, the above description should not be interpreted as a limitation on the scope of the disclosure but merely an illustration.

Although embodiments of the present disclosure are directed to the actuation assembly 500 including the extension rail assembly 502, it is noted herein the actuation assembly 500 may include only the linear rail assembly 504. However, it is contemplated that the both the extension rail assembly 502 and the linear rail assembly 504 may be necessary to allow the actuation assembly 500 to reach to an applied cantilevered load. More generally, it is contemplated that the both the extension rail assembly 502 and the linear rail assembly 504 may be necessary to meet aviation guidelines and standards (e.g., related to weight support and distribution). Therefore, the above description should not be interpreted as a limitation on the scope of the disclosure but merely an illustration.

Figure 6:
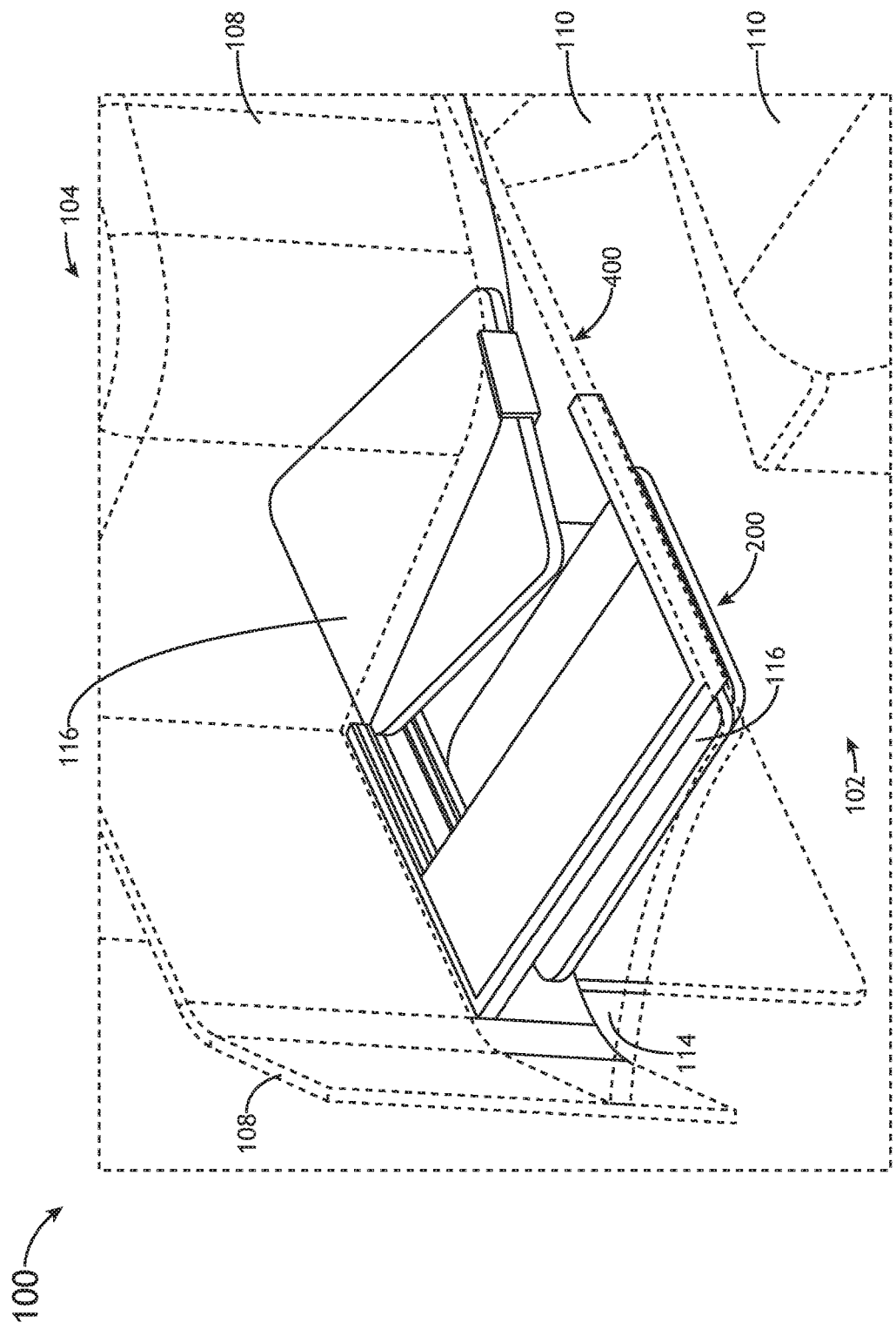
FIG. 6 illustrates a portion of a set of aircraft passenger compartments, each aircraft passenger compartment including an aircraft seat and an actuatable tray assembly, in accordance with one or more embodiments of the disclosure.

FIG. 6 illustrates the aircraft passenger compartments 102, 104 of the aircraft cabin 100, in accordance with one or more embodiments of the disclosure.

The one or more passenger compartment shell sections 108 and/or the one or more monuments 114 of the aircraft passenger compartments 102, 104 may be situated to locate the stowed positions of the respective actuatable trays 116 in as minimized of a space as possible. For example, as illustrated in FIG. 6, the actuatable trays 116 of the aircraft passenger compartments 102, 104 may be nearly touching when in the respective stowed positions. By way of another example, as illustrated in FIG. 6, the tray 116 of the aircraft passenger compartment 104 may be at least partially stowed underneath one or more passenger compartment shell sections 108 and/or one or more monuments 114 of the aircraft passenger compartment 102. Similarly, the tray 116 of the aircraft passenger compartment 102 may be at least partially stowed underneath one or more passenger compartment shell sections 108 and/or the one or more monuments 114 of the aircraft passenger compartment 104.

Figure 7A:
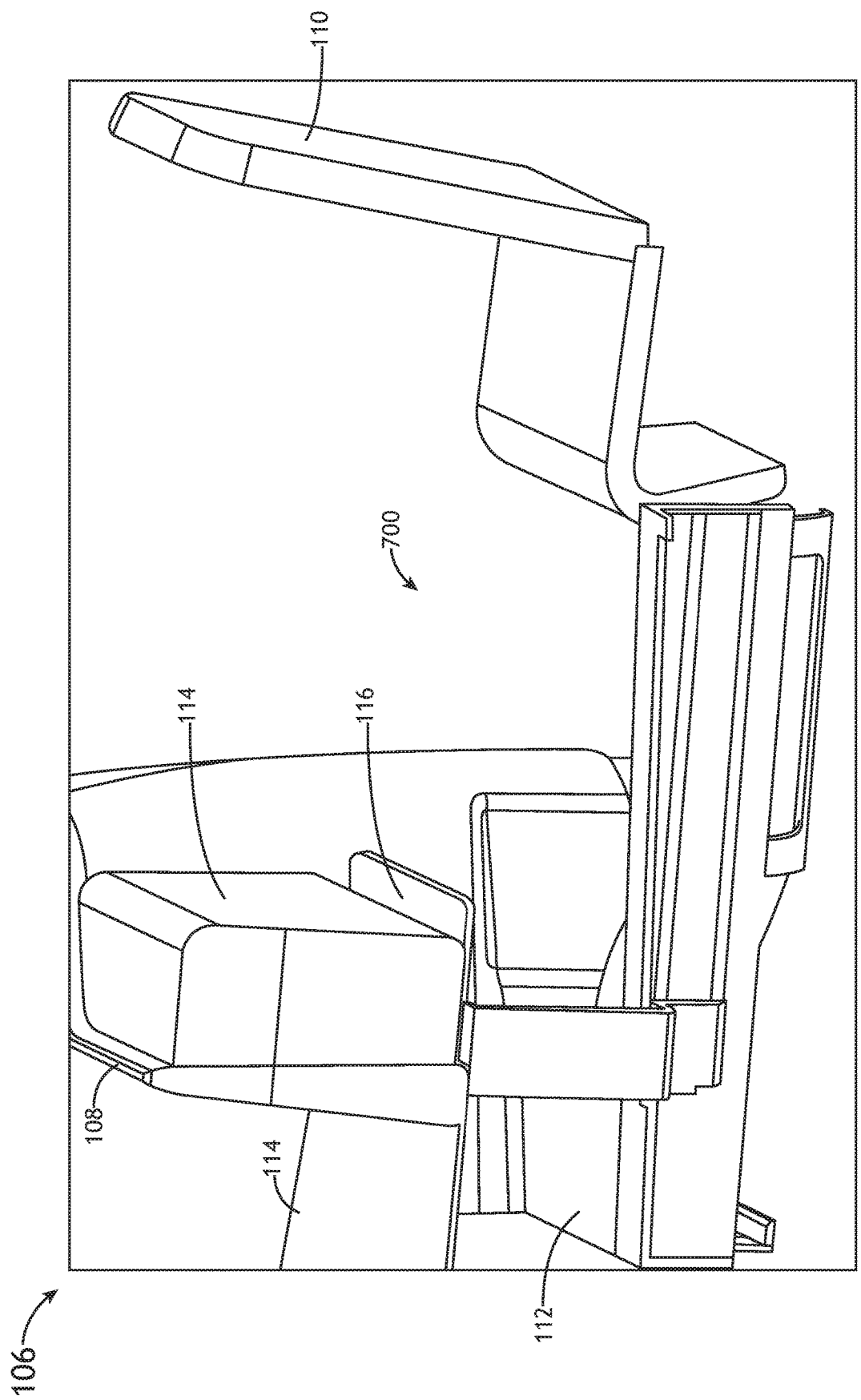
FIG. 7A illustrates an aircraft seat, an actuatable tray assembly, and a portion of an aircraft passenger compartment, in accordance with one or more embodiments of the disclosure.
Figure 7B:
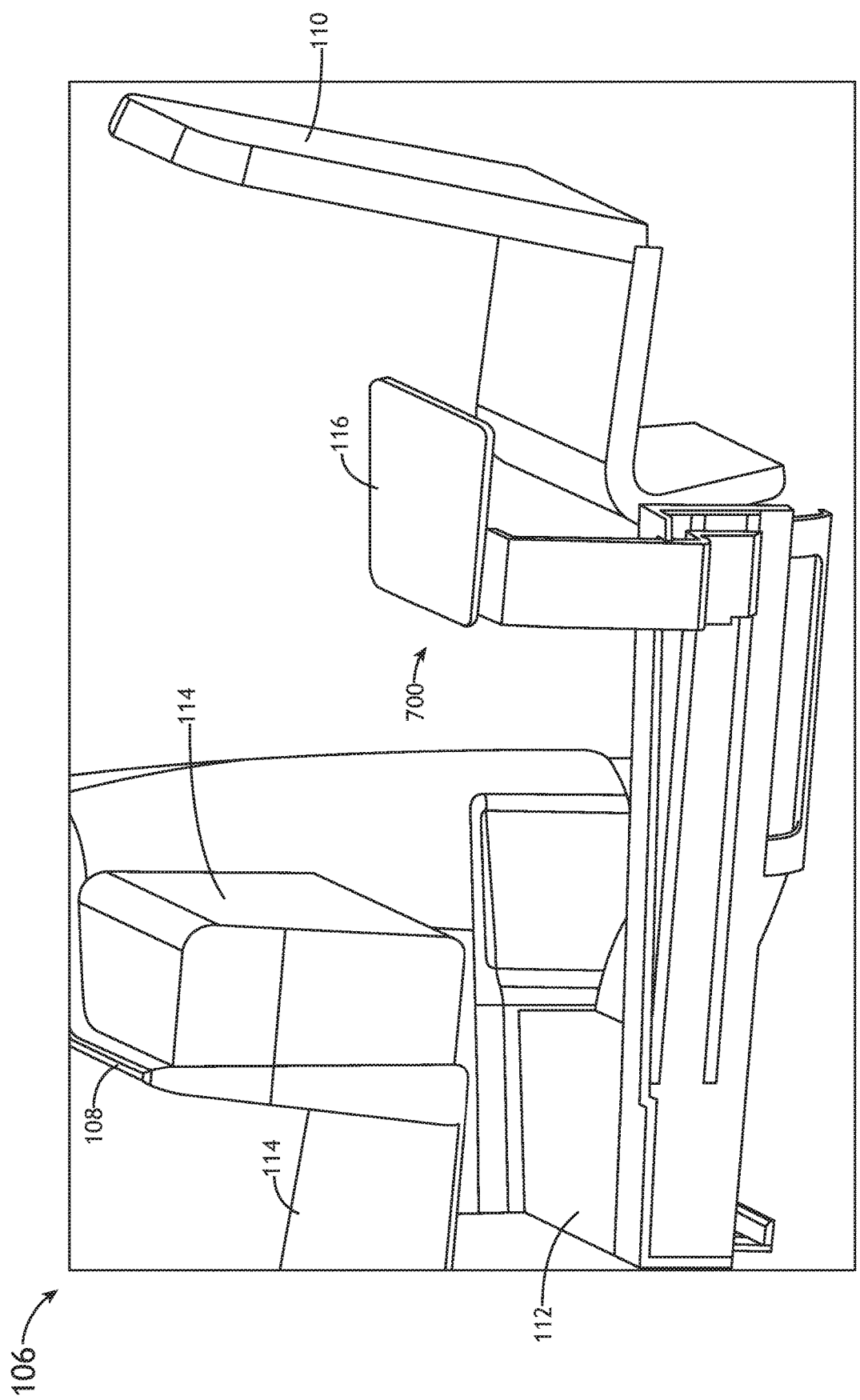
FIG. 7B illustrates an aircraft seat, an actuatable tray assembly, and a portion of an aircraft passenger compartment, in accordance with one or more embodiments of the disclosure.
Figure 8A:
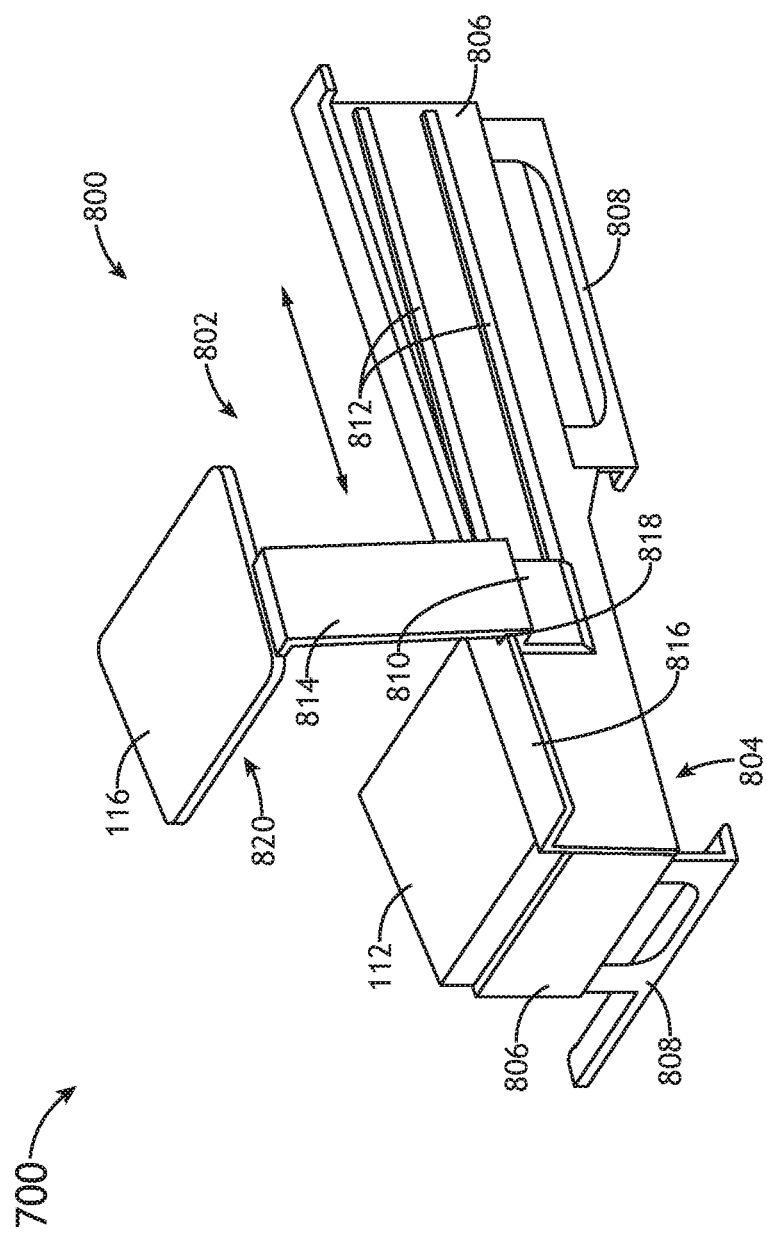
FIG. 8A illustrates a portion of an ottoman assembly including an actuatable tray assembly for an aircraft passenger compartment, in accordance with one or more embodiments of the disclosure.
Figure 8B:
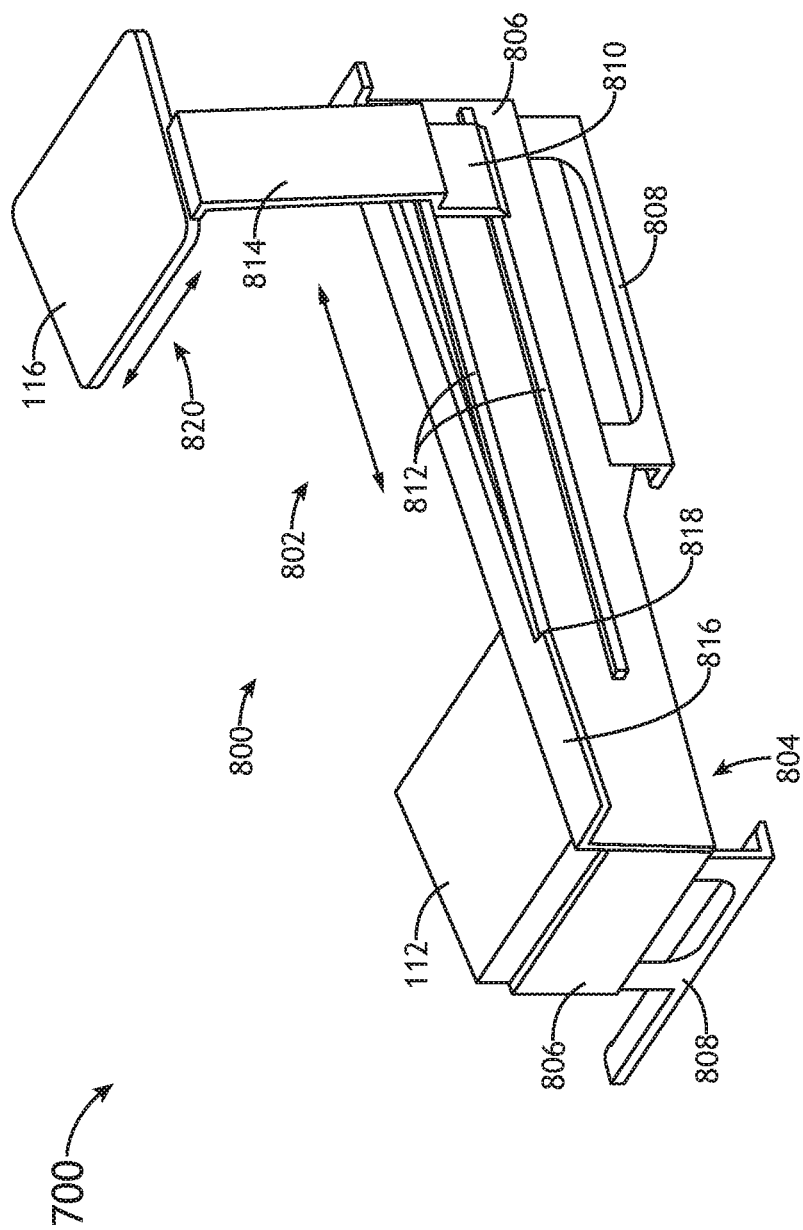
FIG. 8B illustrates a portion of an ottoman assembly including an actuatable tray assembly for an aircraft passenger compartment, in accordance with one or more embodiments of the disclosure.

FIGS. 7A and 7B generally illustrate the tray 116 in various positions within the aircraft passenger compartment 106 relative to other components of the aircraft passenger compartment 106, in accordance with one or more embodiments of the disclosure. FIGS. 8A and 8B generally illustrate components of an actuation assembly 800 configured to actuate the tray 116 relative to other components of the aircraft passenger compartment 106, in accordance with one or more embodiments of the disclosure.

As illustrated in FIGS. 7A and 8A, the tray 116 may be stowed (or stored) underneath a monument 114 in a stowed (or stored) position.

The tray 116 may be a component of an actuatable tray assembly 700. The tray 116 may be entirely stowed under the monument 114. It is noted herein, however, that at least a portion of the tray 116 may extend from underneath the monument 114 (e.g., for ease of passenger interaction). For example, the tray 116 may extend from underneath the monument 114 a select amount such that the tray 116 may be flush with a display device mounted on the monument 114. By way of another example, the tray 116 may extend from underneath the monument 114 by an amount that does not interfere with the passenger's access or usage of the aircraft seat 110, the ottoman 112, any monuments 114 configured to be interacted with by the passenger, or other components of the aircraft passenger compartment 106.

As illustrated in FIGS. 7B and 8B, the tray 116 may be translated from underneath the monument 114 in the stowed position and to an extended position proximate to the passenger in the aircraft seat 110.

The tray 116 may be unlocked from the stowed position (e.g., as illustrated in FIGS. 7A and 8A) via a manual latching or locking assembly (e.g., a push-to-release latch, or the like) to translate to the extended position as illustrated in (e.g., FIGS. 7B and 8B). For example, the manual latching or locking assembly may be situated directly on the tray 116. By way of another example, the manual latching locking assembly may have one or more components situated elsewhere in the aircraft passenger compartment 106 (e.g., on the aircraft seat 110, on a monument 114, or the like). The tray 116 may be unlocked from the stowed position (e.g., as illustrated in FIGS. 7B and 8B) via an electronic latching or locking assembly.

The tray 116 may be coupled to an ottoman assembly 800 via an actuation assembly 802. The tray 116 and the actuation assembly 802 may be components of the actuatable tray assembly 700.

The ottoman assembly 800 may include the ottoman 112 coupled to a credenza or frame assembly 804. The frame assembly 804 may include one or more frame assembly sections 806, where each frame assembly section 806 is coupled to one or more frame assembly legs 808. For example, where there are multiple frame assembly sections 806, the multiple frame assembly sections 806 may be set at an angle to one another (e.g., a 90-degree angle, or another angle between sections of the one or more passenger compartment shell sections 108). For instance, the frame assembly 804 may include a first frame assembly section 806 proximate to the ottoman 112 and a second frame assembly section 806 proximate to the aircraft seat 110, where the first frame assembly section 806 and the second frame assembly section 806 may be set at a substantially perpendicular angle. It is noted herein the frame assembly 804 may operate as an extension for the aircraft seat 110 when in a lie-flat or bed position.

As illustrated in FIGS. 7A and 7B, a portion of the ottoman assembly 800 (e.g., the ottoman 112) may be inserted in a footwell or cavity underneath a monument 114. The frame assembly 804 may extend from underneath the monument 114 to a base of the aircraft seat 110. At least some of the one or more frame assembly sections 806 may be in line with an aircraft passenger compartment shell section 108 and/or in-line with a monument 114. In this regard, the ottoman assembly 800 may form a portion of the aircraft passenger compartment 106, while blocking off an entrance to the aircraft passenger compartment 106.

The actuation assembly 802 may include a carriage 810 configured to actuate along one or more linear rails 812. For example, the one or more linear rails 812 may be coupled to a surface of a frame assembly section 806. For instance, the one or more linear rails 812 may be coupled to an exterior side surface of a frame assembly section 806.

The translation of the carriage 810 along the one or more linear rails 812 may be assisted by one or more actuation devices. For example, the one or more actuation devices may include, but are not limited to, one or more springs (e.g., gas springs, mechanical springs, or the like), one or more actuators (e.g., solenoids, servo motors, or the like), and/or one or more mechanical assemblies driven by an actuator (e.g., one or more gear assemblies such as a worm gear-and-wheel assembly or a rack-and-pinion assembly, one or more chain-and-sprocket assemblies, one or more belt-and-pulley assemblies, or the like).

The actuation assembly 802 may include an arm 814. The arm 814 may be integrated with the carriage 810. For example, the arm 814 and the carriage 810 may be one component formed via one or more simultaneous fabrication processes (e.g., molding, casting, or the like). By way of another example, the arm 814 may be coupled to the carriage 810 with one or more fasteners, an adhesive, or one or more post-fabrication processes (e.g., welding), or the like.

The tray 116 may be coupled to the carriage 810 and configured to actuate along the one or more linear rails 812 with the carriage 810. For example, the tray 116 may be coupled to the arm 814 of the carriage 810. For instance, the arm 814 (or another portion of the carriage 810) may be coupled to a bottom surface of the tray 116. By way of another example, the carriage 810 may translate the tray 116 from the stowed position underneath the monument 114 to the extended position.

Where the one or more linear rails 812 are coupled to a frame assembly section 806, the frame assembly section 806 may include a shield or guard 816. The guard 816 may prevent a passenger from seeing and/or accessing the one or more linear rails 812. The guard 816 may include a stop 818 configured to prevent the actuation assembly 802 (e.g., the carriage 810 and/or the arm 814) from actuating the tray 116 beyond a select point. For example, the guard 816 may prevent the actuation assembly 802 (e.g., the carriage 810 and/or the arm 814) from actuating the tray 116 too far forward, or underneath the monument 114 above the ottoman 112 of the ottoman assembly 800.

The actuation assembly 802 may include a carriage actuation assembly 820, to which the tray 116 may be coupled. For example, the carriage actuation assembly 820 may be configured to adjust the tray 116 to the passenger (e.g., laterally across the body of the passenger in the aircraft seat 110). It is noted herein the carriage actuation assembly 820 may be unlocked to adjust the tray 116 to the passenger (e.g., laterally across the body of the passenger in the aircraft seat 110) via a manual latching or locking assembly (e.g., a push-to-release latch, or the like). For example, the manual latching or locking assembly may be situated directly on the tray 116. By way of another example, the manual latching locking assembly may have one or more components situated elsewhere in the aircraft passenger compartment 106 (e.g., on the aircraft seat 110, on a monument 114, or the like). The tray 116 may be unlocked via an electronic latching or locking assembly.

It is noted herein the carriage actuation assembly 820 may be a component of and/or coupled to the arm 814. In addition, it is noted herein that the carriage actuation assembly 820 may be a component of and/or coupled to the carriage 810.

The carriage actuation assembly 820 may be assisted by one or more actuation devices. For example, the one or more actuation devices may include, but are not limited to, one or more springs (e.g., gas springs, mechanical springs, or the like), one or more actuators (e.g., solenoids, servo motors, or the like), and/or one or more mechanical assemblies driven by an actuator (e.g., one or more gear assemblies such as a worm gear-and-wheel assembly or a rack-and-pinion assembly, one or more chain-and-sprocket assemblies, one or more belt-and-pulley assemblies, or the like).

The design of the actuation assembly 800 may be configured to minimize the visibility of the components of the actuation assembly 802. For example, the one or more linear rails 812 may be positioned out of sight of the passenger of the aircraft passenger compartment 106.

Although the aircraft passenger compartments 102, 104, 106 are illustrated as including different actuation assemblies 300, 500, 800, respectively, it is noted herein that any number of components of the actuation assemblies 300, 500, 800 may be installed in any of the aircraft passenger compartments 102, 104, 106. In addition, is noted herein that any number of components of the actuation assemblies 300, 500, 800 may be mixed with other components of the actuation assemblies 300, 500, 800. Therefore, the above description should not be interpreted as a limitation on the scope of the disclosure but merely an illustration.

Figure 9:
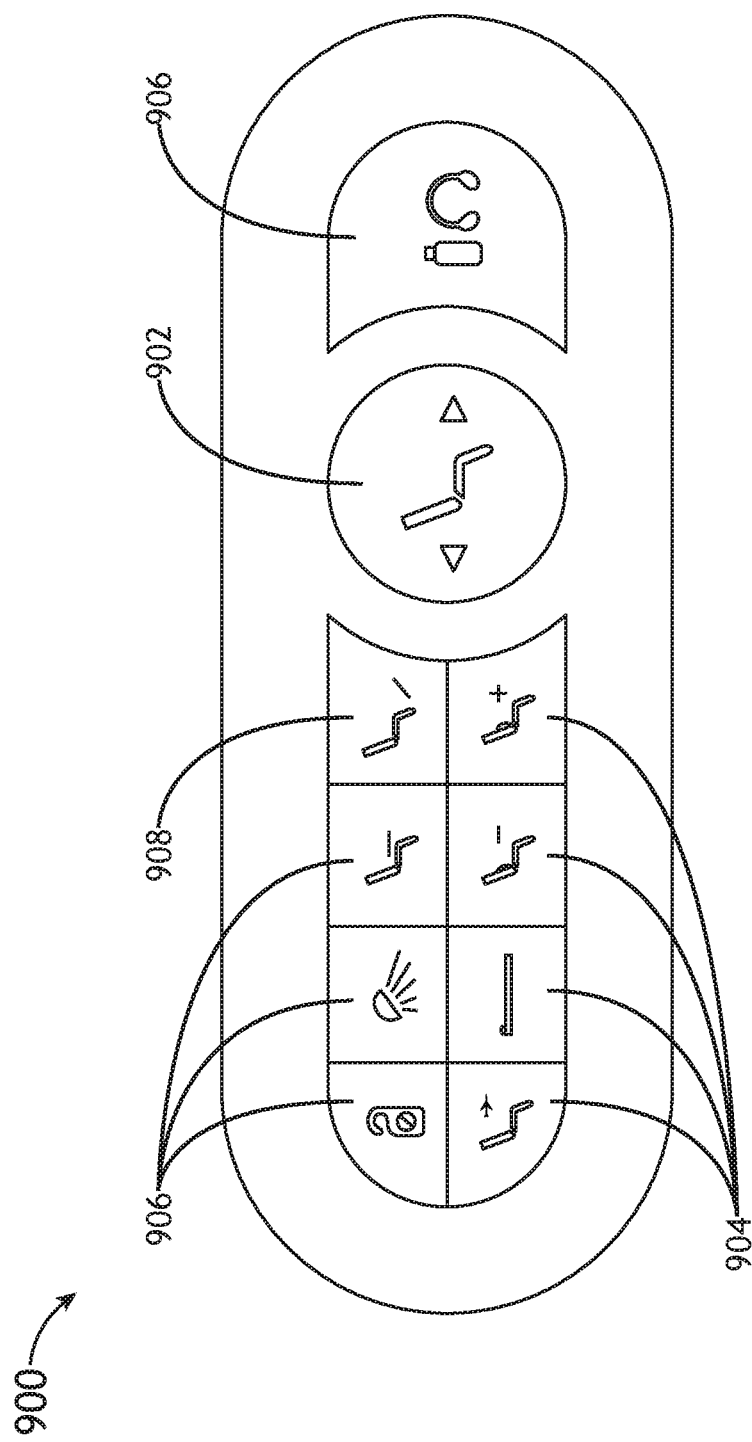
FIG. 9 illustrates a passenger control unit for an aircraft passenger compartment, in accordance with one or more embodiments of the disclosure.

FIG. 9 illustrates a side view of a passenger control unit 900 for the aircraft passenger compartments 102, 104, 106, in accordance with one or more embodiments of the disclosure.

The passenger control unit 900 may be coupled to a surface within the aircraft passenger compartments 102, 104, 106. For example, the passenger control unit 900 may be mounted on or at least be partially inset within a surface of the aircraft seat 110 or the ottoman 112. By way of another example, the passenger control unit 900 may be mounted on a surface or at least be partially inset within a shell section of the one or more passenger compartment shell sections 108 or a monument 114.

It is noted herein the transitioning of the aircraft seat 110 between the recline position, the upright position, and the lie-flat position, the translation and/or rotation of the ottoman 112, and/or the actuation of the tray 116 may be assisted by one or more actuation devices. For example, the one or more actuation devices may include, but are not limited to, one or more springs (e.g., gas springs, mechanical springs, or the like), one or more actuators (e.g., solenoids, servo motors, or the like), and/or one or more mechanical assemblies driven by an actuator (e.g., one or more gear assemblies such as a worm gear-and-wheel assembly or a rack-and-pinion assembly, one or more chain-and-sprocket assemblies, one or more belt-and-pulley assemblies, or the like).

As such, the passenger control unit 900 may include one or more seat toggle switches 902. For example, a seat toggle switch 902 of the one or more seat toggle switches 902 may be configured to translate the aircraft seat 110 forward and/or rearward, where the aircraft seat 110 is fully positionable via translation between the outer limits of motion as defined by the moveable components of the aircraft seat 110.

The passenger control unit 900 may include one or more seat switches 904. For example, a switch 904 of the one or more seat switches 904 may be configured to recline or raise the aircraft seat 110, where the aircraft seat 110 is fully positionable via rotation between the outer limits of motion as defined by the moveable components of the aircraft seat 110. By way of another example, a switch 904 of the one or more seat switches 904 may be configured to re-position the aircraft seat 110 into a lay-flat position. By way of another example, a switch 904 of the one or more seat switches 904 may be configured to re-position the aircraft seat 110 into the upright position (e.g., a TTOL position).

The passenger control unit 900 may include one or more passenger compartment switches 906. For example, a switch 906 of the one or more passenger compartment switches 906 may toggle one or more lights. By way of another example, a switch 906 of the one or more passenger compartment switches 906 may signal to cabin crew that the passenger does not wish to be disturbed for a period of the flight. It is noted herein the one or more passenger compartment switches 906 may be a cover or dust plug for one or more electronics connectors including, but not limited to, one or more headphone jacks, one or more universal serial bus (USB) ports, one or more power outlets, or the like.

The passenger control unit 900 may include one or more ottoman switches 908. Depressing an ottoman switch 908 of the one or more ottoman switches 908 may re-position the ottoman 112 and/or unlock the capability of the ottoman 112 to linearly translate, where the ottoman 112 is fully positionable via translation between the outer limits of motion as defined by the moveable components of the ottoman 112. It is noted herein that depressing an ottoman switch 908 of the one or more ottoman switches 908 may unlock the capability of the ottoman 112 to rotate, where the ottoman 112 is fully positionable via rotation between the outer limits of motion as defined by the moveable components of the ottoman 112.

Figure 10:
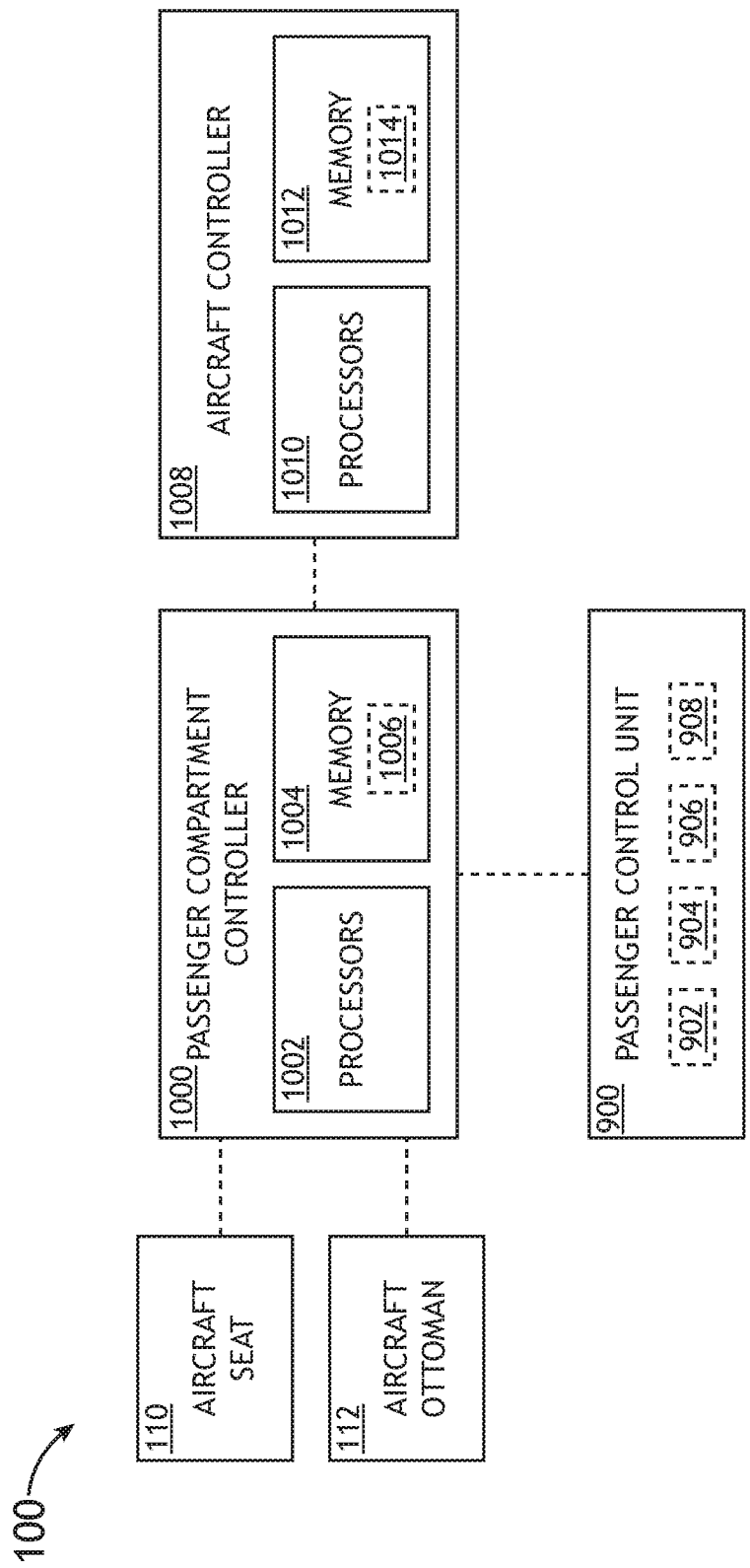
FIG. 10 illustrates a block diagram of an aircraft cabin, in accordance with one or more embodiments of the disclosure.

FIG. 10 illustrates a block diagram of an aircraft cabin 100, in accordance with one or more embodiments of the disclosure The aircraft cabin 100 may include one or more passenger compartment controllers 1000 (e.g., within the aircraft passenger compartments 102, 104, 106). The one or more passenger compartment controllers 1000 may include one or more processors 1002 and memory 1004. The memory 1004 may store one or more sets of program instructions 1006. The one or more processors 1002 may be configured to execute the one or more sets of program instructions 1006 to carry out one or more of the various steps described throughout the present disclosure.

The one or more passenger compartment controllers 1000 may be coupled (e.g., physically and/or communicatively coupled) to components within the aircraft passenger compartments 102, 104, 106 including, but not limited to, the aircraft seat 110, the aircraft ottoman 112, one or more lights, one or more display devices, and/or the passenger control unit 900. For example, one or more signals may be transmitted and/or received between the aircraft seat 110, the aircraft ottoman 112, one or more lights, one or more display devices, and/or the passenger control unit 900. For instance, a signal may be generated via the toggling of a switch 902 and/or a pressing of a switch 904, 906, 908 on the passenger control unit 900, which may be received and processed by the one or more passenger compartment controllers 1000. The one or more passenger compartment controllers 1000 may then transmit the processed one or more signals to an intended end point (e.g., the aircraft seat 110, the aircraft ottoman 112, one or more lights, one or more display devices, and/or the passenger control unit 900).

It is noted herein that the passenger control unit 900 may be considered to be at least a portion of the one or more passenger compartment controllers 1000. For example, the passenger control unit 900 may be a component of the one or more passenger compartment controllers 1000. By way of another example, the passenger control unit 900 may be integrated within the one or more passenger compartment controllers 1000. In addition, it is noted herein that the passenger control unit 900 may be considered to include and/or be a passenger seat control unit, for purposes of the present disclosure.

The aircraft cabin 100 may include one or more aircraft controllers 1008. The one or more aircraft controllers 1008 may include one or more processors 1010 and memory 1012. The memory 1012 may store one or more sets of program instructions 1014. The one or more processors 1010 may be configured to execute the one or more sets of program instructions 1014 to carry out one or more of the various steps described throughout the present disclosure.

The one or more processors 1002, 1010 may include any one or more processing elements known in the art. In this sense, the one or more processors 1002, 1010 may include any microprocessor device configured to execute algorithms and/or program instructions. In general, the term "processor" may be broadly defined to encompass any device having one or more processing elements, which execute a set of program instructions from a non-transitory memory medium (e.g., the memory 1004, 1012), where the one or more sets of program instructions 1006, 1014 are configured to cause the one or more processors 1002, 1010 to carry out any of one or more process steps.

The memory 1004, 1012 may include any storage medium known in the art suitable for storing the one or more sets of program instructions 1006, 1014 executable by the associated one or more processors 1002, 1010. For example, the memory 1004, 1012 may include a non-transitory memory medium. For instance, the memory 1004, 1012 may include, but is not limited to, a read-only memory (ROM), a random access memory (RAM), a magnetic or optical memory device (e.g., disk), a magnetic tape, a solid state drive, and the like. The memory 1004, 1012 may be configured to provide display information to the display device (e.g., the one or more display devices). In addition, the memory 1004, 1012 may be configured to store user input information from a user input device. The memory 1004, 1012 may be housed in a common controller housing with the one or more processors 1002, 1010. The memory 1004, 1012 may, alternatively or in addition, be located remotely with respect to the spatial location of the processors 1002, 1010, the one or more passenger compartment controllers 1000 and/or the one or more aircraft controllers 1008. For instance, the one or more processors 1002, 1010, the one or more passenger compartment controllers 1000, and/or the one or more aircraft controllers 1008 may access a remote memory 1004, 1012 (e.g., server), accessible through a network (e.g., internet, intranet, and the like) via one or more communication interfaces.

The one or more passenger compartment controllers 1000 and/or the one or more aircraft controllers 1008 may be configured to receive and/or acquire data or information from other systems or tools via the one or more communication interfaces that may include wireline and/or wireless portions. In addition, the one or more passenger compartment controllers 1000 and/or the one or more aircraft controllers 1008 may be configured to transmit data or information (e.g., the output of one or more procedures of the inventive concepts disclosed herein) to one or more systems or tools via the one or more communication interfaces that may include wireline and/or wireless portions. In this regard, the transmission medium may serve as a data link between the one or more passenger compartment controllers 1000, the one or more aircraft controllers 1008, and/or other subsystems. In addition, the one or more passenger compartment controllers 1000 and/or the one or more aircraft controllers 1008 may be configured to send data to external systems via a transmission medium (e.g., network connection).

Although the present disclosure is directed to the one or more passenger compartment controllers 1000 and the one or more aircraft controllers 1008 being separate, it is noted herein the one or more passenger compartment controllers 1000 and the one or more aircraft controllers 1008 may be the same and/or share select components. Therefore, the above description should not be interpreted as a limitation on the present disclosure but merely an illustration.

The one or more display devices may include any display device known in the art. For example, the one or more display devices may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. Those skilled in the art should recognize that a variety of display devices may be suitable for implementation in the present invention and the particular choice of display device may depend on a variety of factors, including, but not limited to, form factor, cost, and the like.

In a general sense, any display device capable of integration with the user input device (e.g., touchscreen, bezel mounted interface, keyboard, mouse, trackpad, and the like) is suitable for implementation in the present invention.

The one or more input devices may include any user input device known in the art. For example, the one or more input devices may include, but are not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the one or more display devices may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the input devices may include, but is not limited to, a bezel mounted interface.

Although embodiments of the present disclosure are directed to the one or more display devices being indirectly coupled to the corresponding one or more input devices indirectly (e.g., via the one or more passenger compartment controllers 1000 and/or the one or more aircraft controllers 1008), it is noted herein the one or more display devices may be directly coupled to the corresponding one or more input devices. For example, the one or more display devices may be housed with the one or more input devices in a common user interface housing. Therefore, the above description should not be interpreted as a limitation on the present disclosure but merely an illustration.

Although embodiments of the present disclosure illustrate the actuation of components of the aircraft seat 110 via the passenger control unit 900, it is noted herein that one or more components of the aircraft seat 110 may be actuated by engaging a handle that activates one or more mechanical assemblies. Therefore, the above description should not be interpreted as a limitation on the scope of the disclosure but merely an illustration.

Although the present disclosure is directed to the aircraft seat 110 being installed within the aircraft 100 or aircraft cabin 100, it is noted herein the aircraft seat 110 may be installed within any number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An actuatable tray assembly for an aircraft passenger compartment, comprising:
 a tray configured to stow underneath a monument positioned proximate to an aircraft seat in the aircraft passenger compartment; and
 an actuation assembly, comprising:
  a bracket coupled to the monument, the bracket including at least one track member;
  at least one rail configured to actuate along the at least one track member via at least one slider; and
  a carriage coupled to the tray,
  at least a portion of the carriage and the at least one rail being protected by a cover,
  the carriage configured to actuate the tray in a first direction along the at least one rail from a stowed position to a first extended position,
  the carriage and the at least one rail configured to actuate the tray in a second direction along the at least one track member via the at least one slider from the first extended position to a second extended position.

2. The actuatable tray assembly of claim 1, the second direction being at a substantially perpendicular angle relative to the first direction.

3. The actuatable tray assembly of claim 2, the first direction including a translation of the tray across a body of a passenger in the aircraft seat, the second direction including a translation of the tray toward or away the passenger in the aircraft seat.

4. The actuatable tray assembly of claim 3, the translation of the tray across the body of the passenger in the aircraft seat occurring before the translation of the tray toward or away the passenger in the aircraft seat.

5. The actuatable tray assembly of claim 3, a distance in the first direction between the stowed position to the first extended position being less than a distance in the second direction between the first extended position and the second extended position.

6. The actuatable tray assembly of claim 1, the at least one slider being coupled to a surface of the cover.

7. The actuatable tray assembly of claim 1, the at least one track member including a first track member and a second track member, the at least one slider including a first slider configured to actuate along the first track member and a second slider configured to actuate along the second track member,
 the at least one rail including a first rail and a second rail, a first end of the first rail and a first end of the second rail being coupled to the first track member via the first slider, a second end of the first rail and a second end of the second rail being coupled to the second track member via the second slider,
 the carriage being coupled to the first rail and the second rail.

8. The actuatable tray assembly of claim 7, the first track member and the second track member being coupled together via a crossmember.

9. The actuatable tray assembly of claim 8, the bracket being in a U-shape formed by the first track member, the second track member, and the crossmember.

10. The actuatable tray assembly of claim 1, the carriage being a two-stage carriage with a carriage actuation assembly.

11. The actuatable tray assembly of claim 10, the actuation of the tray in the first direction along the at least one rail from the stowed position to the first extended position including a translation of a first portion of the carriage and a second portion of the carriage along the at least one rail.

12. The actuatable tray assembly of claim 10, the actuation of the tray in the first direction along the at least one rail from the stowed position to the first extended position including a translation of the first portion of the carriage relative to the second portion of the carriage via the carriage actuation assembly.

13. The actuatable tray assembly of claim 1, the bracket being coupled to a bottom surface of the monument.

14. An actuatable tray assembly for an aircraft passenger compartment, comprising:
 a tray configured to stow underneath a monument positioned proximate to an aircraft seat in the aircraft passenger compartment; and
 an actuation assembly, comprising:
  a bracket coupled to the monument, the bracket including at a first track member and a second track member;
  a first rail and a second rail configured to actuate along the first track member and the second track member via a first slider configured to actuate along the first track member and a second slider configured to actuate along the second track member, a first end of the first rail and a first end of the second rail being coupled to the first track member via the first slider, a second end of the first rail and a second end of the second rail being coupled to the second track member via the second slider; and
  a carriage coupled to the tray, the carriage being coupled to the first rail and the second rail,
  the carriage configured to actuate the tray in a first direction along the first rail and the second rail from a stowed position to a first extended position,
  the carriage and the first rail and the second rail configured to actuate the tray in a second direction along the first track member and the second track member via the first slider and the second slider from the first extended position to a second extended position.

15. The actuatable tray assembly of claim 14, the first track member and the second track member being coupled together via a crossmember.

16. The actuatable tray assembly of claim 15, the bracket being in a U-shape formed by the first track member, the second track member, and the crossmember.

17. An actuatable tray assembly for an aircraft passenger compartment, comprising:
 a tray configured to stow underneath a monument positioned proximate to an aircraft seat in the aircraft passenger compartment; and
 an actuation assembly, comprising:
  a bracket coupled to the monument, the bracket including at least one track member;
  at least one rail configured to actuate along the at least one track member via at least one slider; and
  a carriage coupled to the tray,
  the carriage being a two-stage carriage with a carriage actuation assembly,
  the carriage configured to actuate the tray in a first direction along the at least one rail from a stowed position to a first extended position,
  the carriage and the at least one rail configured to actuate the tray in a second direction along the at least one track member via the at least one slider from the first extended position to a second extended position.

18. The actuatable tray assembly of claim 17, the actuation of the tray in the first direction along the at least one rail from the stowed position to the first extended position including a translation of a first portion of the carriage and a second portion of the carriage along the at least one rail.

19. The actuatable tray assembly of claim 17, the actuation of the tray in the first direction along the at least one rail from the stowed position to the first extended position including a translation of the first portion of the carriage relative to the second portion of the carriage via the carriage actuation assembly.

\* \* \* \* \*